(12) United States Patent
Shin et al.

(10) Patent No.: US 8,947,389 B1
(45) Date of Patent: Feb. 3, 2015

(54) TOUCH PANEL AND DISPLAY DEVICE

(71) Applicant: LG Display Co., Ltd., Seoul (KR)

(72) Inventors: SeungRok Shin, Goyang-si (KR); DeukSu Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/140,216

(22) Filed: Dec. 24, 2013

(30) Foreign Application Priority Data

Oct. 15, 2013 (KR) .......................... 10-2013-0122434

(51) Int. Cl.
 *G06F 3/041* (2006.01)
 *G06F 3/045* (2006.01)
(52) U.S. Cl.
 CPC ...... *G06F 3/045* (2013.01); *G06F 2203/04102* (2013.01)
 USPC .......................... 345/173; 345/174; 178/18.06
(58) Field of Classification Search
 USPC ...................... 345/173, 174; 178/18.01, 18.06
 See application file for complete search history.

(56) References Cited

U.S. PATENT DOCUMENTS

| | | | | |
|---|---|---|---|---|
| 5,488,498 | A * | 1/1996 | Fujii et al. | 349/149 |
| 7,750,888 | B2 * | 7/2010 | Song et al. | 345/103 |
| 8,373,838 | B2 * | 2/2013 | Tang | 349/152 |
| 2008/0238433 | A1 * | 10/2008 | Joutsenoja et al. | 324/457 |
| 2010/0026659 | A1 * | 2/2010 | Long et al. | 345/174 |
| 2011/0279410 | A1 * | 11/2011 | Han et al. | 345/174 |
| 2013/0106781 | A1 * | 5/2013 | Oh | 345/174 |
| 2014/0225840 | A1 * | 8/2014 | Jamshidi-Roudbari et al. | 345/173 |

* cited by examiner

*Primary Examiner* — Priyank Shah
(74) *Attorney, Agent, or Firm* — Fenwick & West LLP

(57) ABSTRACT

The present invention generally relates to a touch panel including first electrodes, second electrodes, first signal wires connected to the first electrodes, and second signal wires connected to the second electrodes, two or more flexible printed circuit boards (FPCBs) being attached to one side of the touch panel to be spaced apart from each other by a distance which allows installation of an application component can be installed, and a display device including the same.

14 Claims, 15 Drawing Sheets

$T1(1) + T1(2) + \cdots + T1(n) = T1$
$T2(1) + T2(2) + \cdots + T2(n) = T2$
$\vdots$
$Tm(1) + Tm(2) + \cdots + Tm(n) = Tm$

TOUCH PANEL AND DISPLAY DEVICE

CROSS-REFERENCE TO RELATED APPLICATION

This application claims priority from and the benefit under 35 U.S.C. §119(a) of Korean Patent Application No. 10-2013-0122434, filed on Oct. 15, 2013, which is hereby incorporated by reference for all purposes as if fully set forth herein.

BACKGROUND OF THE INVENTION

1. Field of the Invention

The present invention relates to a touch panel and a display device.

2. Description of the Prior Art

As an information-oriented society has been developed, demand for a display device for displaying images increases in various forms. In recent years, various display devices such as a Liquid Crystal Display (LCD), a Plasma Display Panel (PDP), and an Organic Light Emitting Diode Display Device (OLED) are utilized.

Such a display device does not employ a conventional input scheme such as a button, a keyboard, and/or a mouse, and provides a touch-based input scheme by which a user can intuitively and conveniently input information or a command.

In order to provide such a touch-based input scheme, a touch panel should be included in the display device, and a Flexible Printed Circuit Board (FPCB) for transferring a signal for detecting a touch should be attached to the touch panel.

Meanwhile, application devices or modules related to various functions are installed in the display device.

In the related art, when the touch panel and the FPCB are designed, installation of the application components for the display device is not considered. Thus, when the display device is assembled, mechanical collision between the FPCB and the application components may occur, the assembly may be not completed so that the touch panel and the FPCB must be redesigned, and/or the installation position of the application components must be changed.

Further, in the related art, a signal transmission line for detecting a touch is formed of a metal material such as silver on the touch panel, which is a main cause of adding a manufacturing process in which the signal transmission line is formed on the touch panel in addition to a basic manufacturing process in which a driving electrode and a sensing electrode as a touch sensor are formed on the touch panel, thereby making the manufacturing process thereof complex and increasing manufacturing costs thereof.

SUMMARY OF THE INVENTION

Accordingly, the present invention has been made to solve the above-mentioned problems occurring in the prior art, and an object of the present invention is to provide a touch panel and a display device having a structure in which application components are easily installed.

Another object of the present invention is to provide a touch panel and a display device having a signal transmission line connection structure for effectively detecting a touch.

Another object of the present invention is to provide a touch panel and a display device in which a material of a signal transmission line additionally formed on the touch panel to transfer a signal between a plurality of FPCBs is the same as that of an electrode, thereby making the manufacturing process simpler.

In order to accomplish the object, there is provided a display device including: a touch panel including first electrodes, second electrodes, first signal wires connected to the first electrodes, and second signal wires connected to the second electrodes; and two or more FPCBs attached to one side of the touch panel and spaced apart from each other by a distance which allows installation of an application component.

In order to accomplish the object, there is provided a touch panel including: first electrodes and second electrodes formed as a touch sensor; signal wires connected to the first electrodes and the second electrodes; and attachment portions to which the two or more FPCBs, in which the signal lines connected to all or some of the signal wires are formed, are attached and spaced apart from each other so as to enable installation of an application component of the display device including the touch panel.

In accordance with an aspect of the present invention, there is provided a touch panel and a display device having a structure in which application components are easily installed.

In accordance with another aspect of the present invention, there is provided a touch panel and a display device having an effective signal transmission line connection structure.

In accordance with another aspect of the present invention, there is provided a touch panel and a display device in which a material of a signal transmission line additionally formed on the touch panel to transfer a signal between a plurality of FPCBs attached to the touch panel is the same as that of an electrode, thereby making the manufacturing process simpler.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
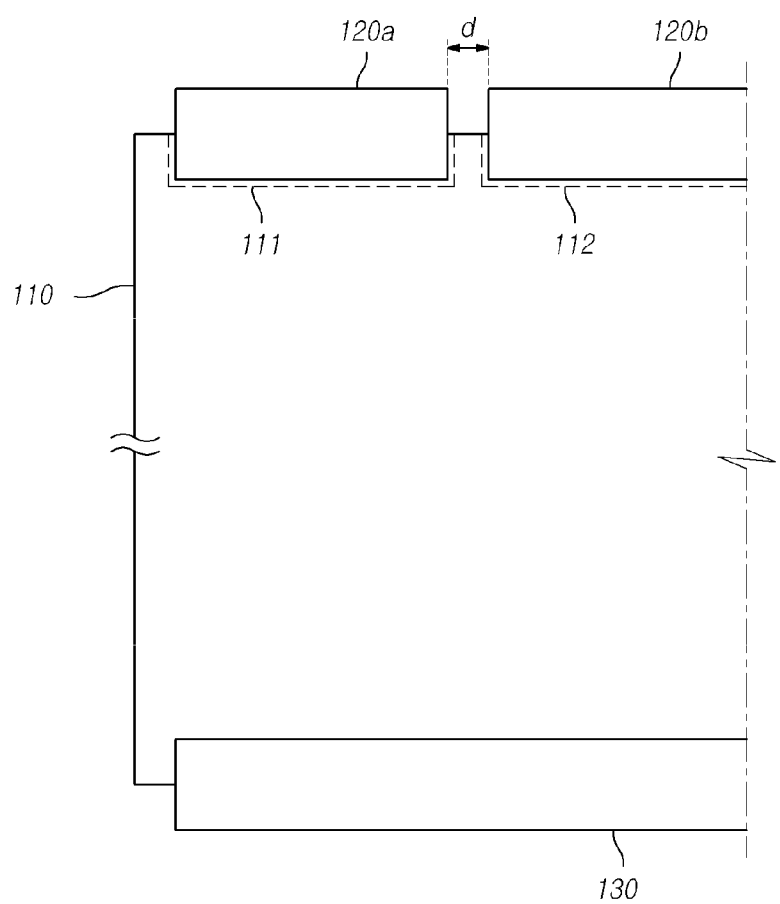
FIG. 1 illustrates a part of a display device according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates a part of a display device according to an embodiment of the present invention.

Referring to FIG. 1, the display device 100 according to an embodiment of the present invention includes a touch panel 110 on which first electrodes and second electrodes of a touch sensor are formed, two or more Flexible Printed Circuit Boards (FPCBs) 120a, 120b, . . . attached to one side of the touch panel 110, and one or more FPCBs 130 attached to another side of the touch panel 110.

The touch panel 110 according to an embodiment of the present invention further includes first signal wires connected to the first electrodes, and second signal wires connected to the second electrodes, in addition to the first electrodes and the second electrodes.

As mentioned above, the two or more FPCBs 120a, 120b, . . . are attached to the one side of the touch panel 100. When the two or more FPCBs 120a, 120b, . . . are attached to the one side of the touch panel 100, the two or more FPCBs 120a, 120b, . . . may be attached such that they are spaced apart from each other.

To this end, the touch panel 110 according to an embodiment of the present invention has attachment portions 111 and 112 to which the two or more FPCBs 120a and 120b, on which signal lines connected to all or a part of the signal wires connected to the first electrodes and the second electrodes, respectively, are formed, are attached such that they are spaced apart from each other.

The attachment portions 111 and 112 are spaced apart from each other by a distance which allows installation of application components of the display device 100 including the touch panel 110.

Such a spaced attachment structure corresponds to a structure for easily installing the application components included in the display device 100. Thus, the two or more FPCBs 120a, 120b, . . . attached to the one side of the touch panel 110 are spaced apart from each other by a distance d which allows installation of the application components of the display device 100. Here, the application components of the display device include, for example, one or more of a speaker module, a camera module, and a sensor module.

Each of the two or more FPCBs 120a, 120b, . . . attached to the one side of the touch panel 110 may have first signal lines connected to the whole of the first signal wires connected to the first electrodes through pads formed on the touch panel 110. Further, the one or more FPCBs 130 attached to the another side of the touch panel 110 may have second signal lines connected to the second signal wires connected to the second electrodes through the pads formed on the touch panel 110. Such a signal line formation structure in the FPCBs corresponds to a signal wire structure of the touch panel 110 which will be described with reference to FIG. 3.

In some embodiments, unlike the signal line formation structure in the FPCBs described above, each of the two or more FPCBs 120a, 120b, . . . attached to the one side of the touch panel 110 may have first signal lines connected to the whole of the first signal wires connected to the first electrodes through pads formed on the touch panel 110, and the one or more FPCBs 130 attached to the another side of the touch panel 110 may have the first signal lines excluding the first signal wires connected to the first signal lines formed on the two or more FPCBs 120a, 120b, . . . attached to the one side of the touch panel 110 of the first signal wires connected to the first electrodes through the pads formed on the touch panel 110, and the second signal lines connected to the second signal wires connected to the second electrodes through the pads formed on the touch panel 110. Such a signal line formation structure in the FPCBs corresponds to a signal wire structure of the touch panel 110 which will be described with reference to FIG. 4.

Meanwhile, the touch panel 110 further includes additional pads for connecting the first signal lines formed on the two or more FPCBs 120a, 120b, . . . attached to the one side of the touch panel 110 to each other, and additional connection lines connected between the additional pads. That is, the signal lines in the FPCBs 120a, 120b, . . . attached to the one side of the touch panel 110 are correspondingly connected to each other through the additional pads and the additional connection lines. When performing the connection, the signal lines connected to the first signal wires connected to the first electrodes, which exist at the same position (for example, at the same row), are connected to each other. Accordingly, a driving voltage for detecting a touch can be simultaneously applied.

Figure 10:
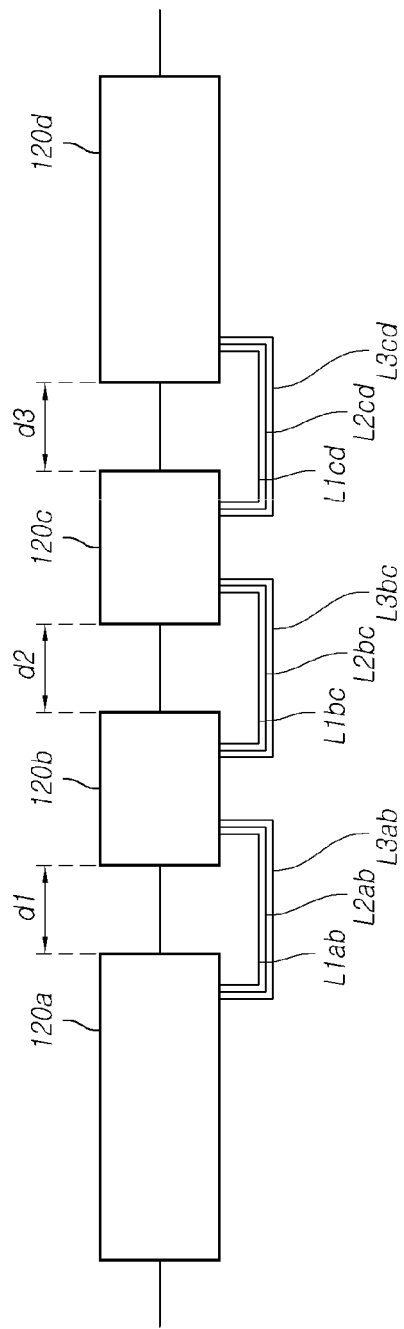
FIG. 10 illustrates a connection line pattern between FPCBs in a display device according to another embodiment of the present invention.

Some embodiments use a pattern in which additional connection lines connected between additional pads are formed on the touch panel 110, especially, when the three or more FPCBs 120a, 120b, 120c, . . . are attached to the one side of the touch panel 110 such that they are spaced apart from each other, in a case where the numbers of additional pads formed on each of the three or more FPCBs 120a, 120b, 120c, . . . attached to the one side of the touch panel 110 are different from each other, connection lines connected between the additional pads formed on each of the three or more FPCBs attached to the one side of the touch panel 110 may be formed on the touch panel 110 in the same pattern (See FIG. 10).

Figure 13:
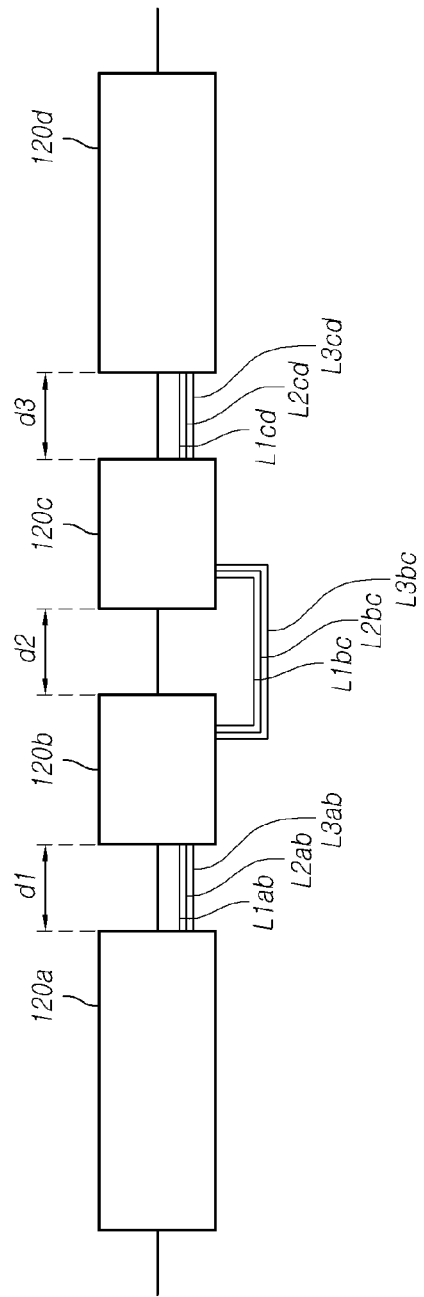
FIG. 13 illustrates a connection line pattern between FPCBs in a display device according to yet another embodiment of the present invention.

Another pattern used in some embodiments, especially, when the three or more FPCBs 120a, 120b, 120c, . . . are attached to the one side of the touch panel 110 such that they are spaced apart from each other, in a case where the numbers of additional pads formed on each of the three or more FPCBs 120a, 120b, 120c, . . . attached to the one side of the touch panel 110 are equal to each other, connection lines connected between the additional pads formed on each of the three or more FPCBs attached to the one side of the touch panel 110 may be formed on the touch panel 110 in a zigzag pattern (See FIG. 13).

As described above, the connection lines connected between the additional pads in the touch panel 110 may be formed of the same material as the electrode material of the first electrodes and the second electrodes. Accordingly, in a case where the touch panel 110 is manufactured, when the first electrodes and the second electrodes are formed, the connection lines may be formed in the same manufacturing process together, so that the manufacturing process may be simple and manufacturing costs can be reduced.

Here, the electrode material of the first electrodes and the second electrodes may be one of, for example, Indium Tin Oxide (ITO), Indium Zinc Oxide (IZO), Oxide/Metal/Oxide (OMO), ITO/metal (for example, Ag)/ITO, IZO/metal (for example, Ag)/IZO, an Ag nano-wire, a metal mesh, a conductive polymer, and the like.

Meanwhile, a touch Integrated Circuit (IC) may be located on one of the two or more FPCBs 120a, 120b, . . . attached to the one side of the touch panel 110 and the one or more FPCBs 130 attached to the another side of the touch panel 110.

Such a touch IC should be connected to all of the first electrodes and the second electrodes in a circuit in order to transfer a signal. Thus, additional signal wires for connecting, to the touch IC, signal lines formed on each of the FPCBs where the touch IC is not located among the two or more FPCBs 120a, 120b, . . . attached to the one side of the touch panel 110 and the one or more FPCBs 130 attached to the another side of the touch panel 110 may be formed at the outer side of the touch panel 110.

Here, the additional signal wires formed at the outer side of the touch panel 110 may be formed of the same material as that of the electrode described above. Accordingly, in a case where the touch panel 110 is manufactured, when the first electrodes and the second electrodes are formed, the additional signal wires may be formed in the same manufacturing process together, so that the manufacturing process may be simple and manufacturing costs can be reduced.

In various embodiments, the display device 100 can detect a touch in a projected capacitive scheme using the touch panel 110 in which two kinds of electrodes (first electrode and second electrode) are formed, and particularly, can detect a touch by using a mutual capacitance scheme in which one electrode of the first electrode and the second electrode is a driving electrode to which a driving voltage is applied (also, referred to as "Tx electrode"), the other electrode of the first electrode and the second electrode is a sensing electrode in which the driving voltage is sensed (also, referred to as "Rx electrode"), and whether a touch event occurs and coordinates of a touch position are detected by measuring a variation in capacitance formed between the first electrode and the second electrode according to existence of a touch of a pointer (for example, a finger or the like).

Herein, the first electrodes mentioned above may correspond to a driving electrode or a sensing electrode, and the second electrodes may correspond to a sensing electrode or a driving electrode. However, in the following description, for the convenience of description, the present invention will be described based on assumption that the first electrodes correspond to the driving electrodes (Tx electrodes) and the second electrodes correspond to the sensing electrodes (Rx electrodes).

Since the display device 100 according to an embodiment of the present invention detects a touch in the mutual capacitance scheme as described above, and has a structural characteristic in which the two or more FPCBs 120a, 120b, . . . are attached to the one side of the touch panel 110 but are spaced apart from each other by a predetermined distance d, it is required that the touch panel 110 is designed to match with the structural characteristic and various signal transmission lines and pads are designed to have structures corresponding to the structure of the touch panel 110.

Although this characteristic is described above simply, hereinafter this characteristic will be described in more detail with reference to FIGS. 2 to 13.

Hereinafter, an electrode structure of the touch panel 110 to which various embodiments can be applied will be described with reference to FIG. 2.

Before the electrode structure of the touch panel 110 to which various embodiments can be applied is described, the touch panel 110 to which embodiments are applied may have a double layer electrode structure in which the first electrodes T1, T2, . . . , Tm and the second electrodes R1, R2, . . . , Rn separately are formed on two layers or a single layer electrode structure in which the first electrodes T1, T2, . . . , Tm and the second electrodes R1, R2, . . . , Rn are formed on one layer.

In a case of the double layer electrode structure in which the first electrodes T1, T2, . . . , Tm and the second electrodes R1, R2, . . . , Rn separately are formed on two layers, the first electrodes T1, T2, . . . , Tm are formed in a first layer in a first direction (for example, in a horizontal direction), and the second electrodes R1, R2, . . . , Rn are formed in a second layer in a second direction (for example, in a vertical direction). A point where the first electrodes T1, T2, . . . , Tm and the second electrodes R1, R2, . . . , Rn intersect with each other becomes a sensor node, so that the mutual capacitance can be measured.

Although the double layer electrode structure in which the first electrodes T1, T2, . . . , Tm and the second electrodes R1, R2, . . . , Rn are separately formed in two layers may be formed as described above, the single layer electrode structure in which the first electrodes T1, T2, . . . , Tm and the second electrodes R1, R2, . . . , Rn are formed in one layer will be described below.

Figure 2:
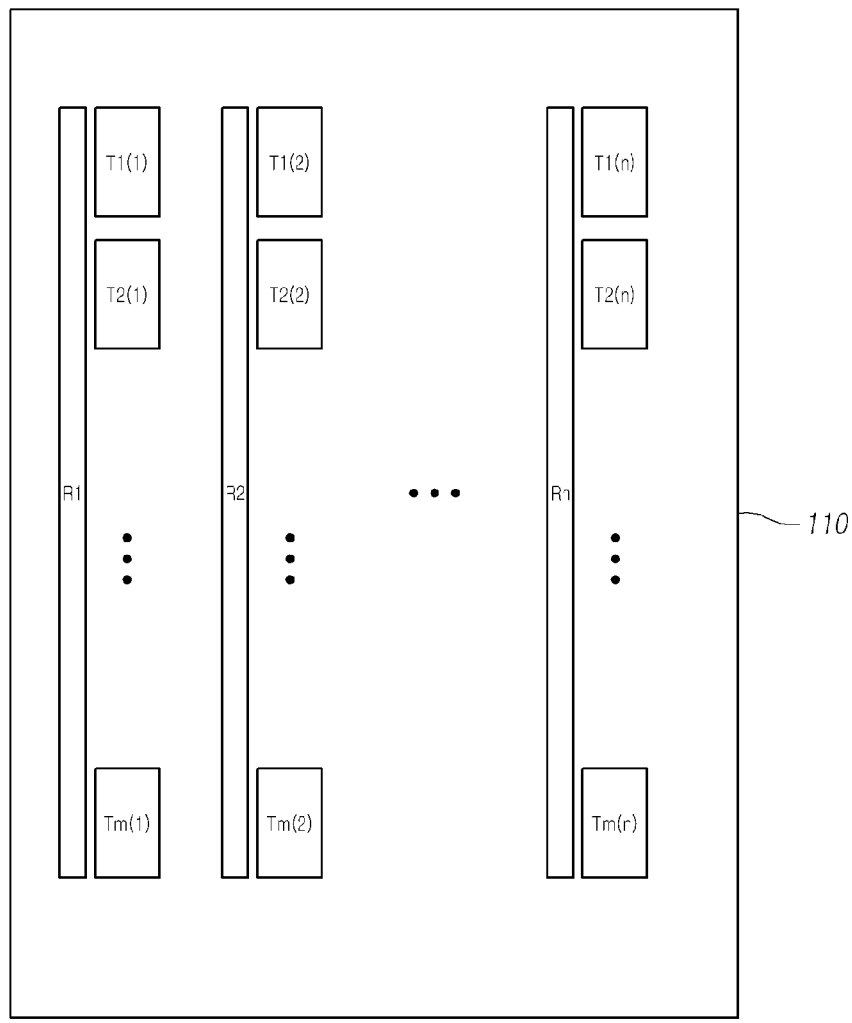
FIG. 2 illustrates an electrode structure of a touch panel according to an embodiment of the present invention.

FIG. 2 illustrates an electrode structure of a touch panel according to an embodiment of the present invention.

As shown in FIG. 2, the touch panel 110 to which embodiments are applied may have a double layer electrode structure in which the first electrodes T1(1)~T1(n), T2(1)~T2(n), . . . , Tm(1)~Tm(n) and the second electrodes R1, R2, . . . , Rn are separately formed on two layers or a single layer electrode structure in which the first electrodes T1(1)~T1(n), T2(1)~T2(n), . . . , Tm(1)~Tm(n) and the second electrodes R1, R2, . . . , Rn are formed on one layer.

The n first electrodes T1(1)~T1(n) formed in the first row correspond to separated first electrodes, but are connected to each other in a circuit through a signal transmission line, so as to serve as one first electrode T1. The n first electrodes T2(2)~T2(n) formed in the second row correspond to separated first electrodes, but are connected to each other in a circuit through a signal transmission line, so as to serve as one first electrode T2. The n first electrodes Tm(1)~Tm(n) formed in the mth row correspond to separated first electrodes, but are connected to each other in a circuit through a signal transmission line, so as to serve as one first electrode Tm.

Here, the first electrodes T1(1)~T1(n), T2(1)~T2(n), . . . , Tm(1)~Tm(n) correspond to driving electrodes (Tx electrodes) to which a driving voltage is applied, and the second electrodes R1, R2, . . . , Rn correspond to sensing electrodes (Rx electrodes) by which a driving voltage is sensed.

Capacitance is formed between the first electrodes and the second electrodes, the capacitance formed between the first electrodes and the second electrodes are varied according to the existence of a touch of a pointer (a finger or the like), and the existence of the touch and coordinates of the touch can be detected by measuring a variation in the capacitance.

As shown in FIG. 2, the second electrodes R1, R2, ..., Rn are formed at each column in a vertical direction. Further, one of the first electrodes T1(1)~T1(n), T2(1)~T2(n), ..., Tm(1)~Tm(n) is formed at each sensor node.

Referring to FIG. 2, the first electrodes in the same row of the first electrodes T1(1)~T1(n), T2(1)~T2(n), ..., Tm(1)~Tm(n) are connected to each other in a circuit so that the driving voltage is simultaneously applied (transferred) to the first electrodes. For example, the first electrodes T1(1), T1(2), ..., T1(n) formed in the first row are connected to each other through signal wires and various signal transmission lines (signal lines, connection lines, additional signal wires, and the like) so as to simultaneously receive the driving voltage (driving pulse). The first electrodes T2(2), T2(2), ..., T2(n) formed in the second row are connected to each other through signal wires and various signal transmission lines (signal lines, connection lines, additional signal wires, and the like) so as to simultaneously receive the driving voltage (driving pulse). The first electrodes Tm(2), Tm(2), ..., Tm(n) formed in the mth row are connected to each other through signal wires and various signal transmission lines (signal lines, connection lines, additional signal wires, and the like) so as to simultaneously receive the driving voltage (driving pulse).

A signal wire structure according to the electrode structure of the touch panel described above will be described below with reference to FIGS. 3 and 4. However, in the following description, for the convenience of description, the present invention will be described based on exemplification that the first electrodes are formed at each of six rows and the second electrodes are formed at each of four columns.

Figure 3:
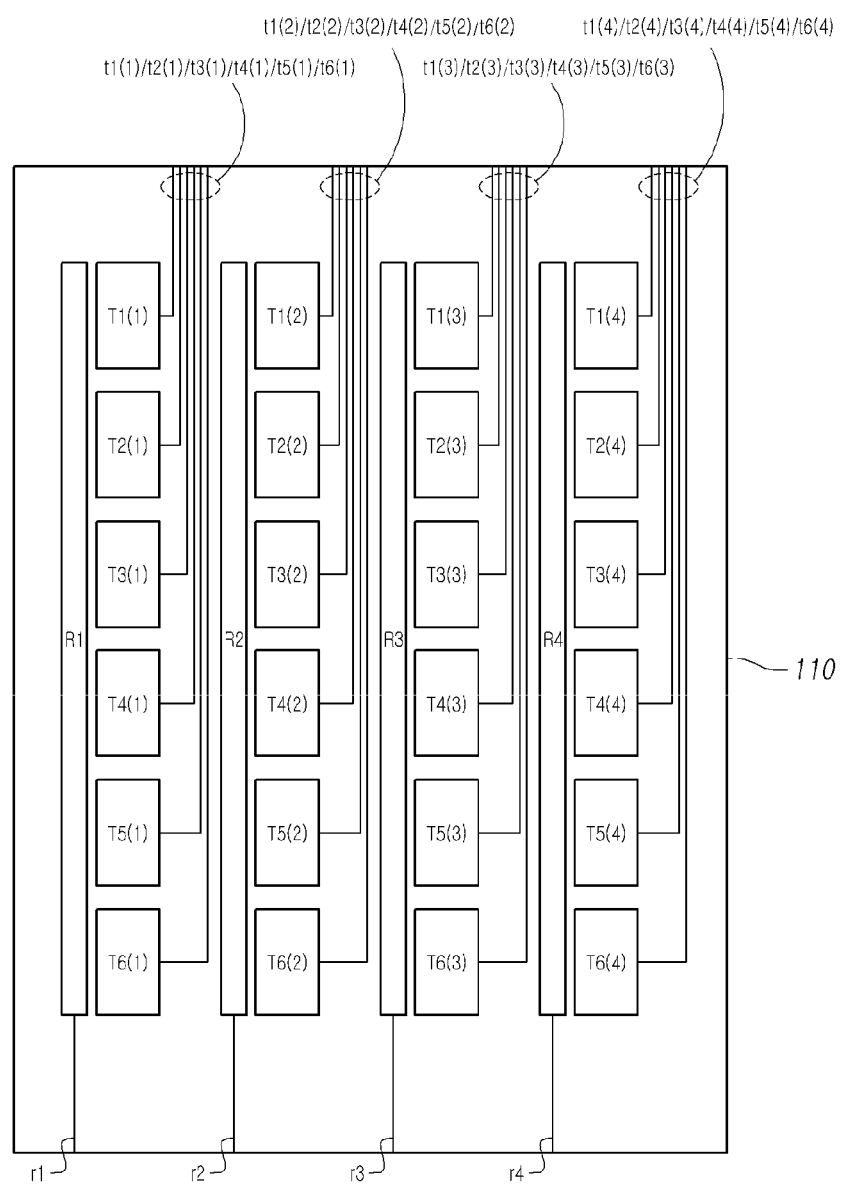
FIG. 3 illustrates a signal wire structure of a touch panel according to an embodiment of the present invention.
Figure 4:
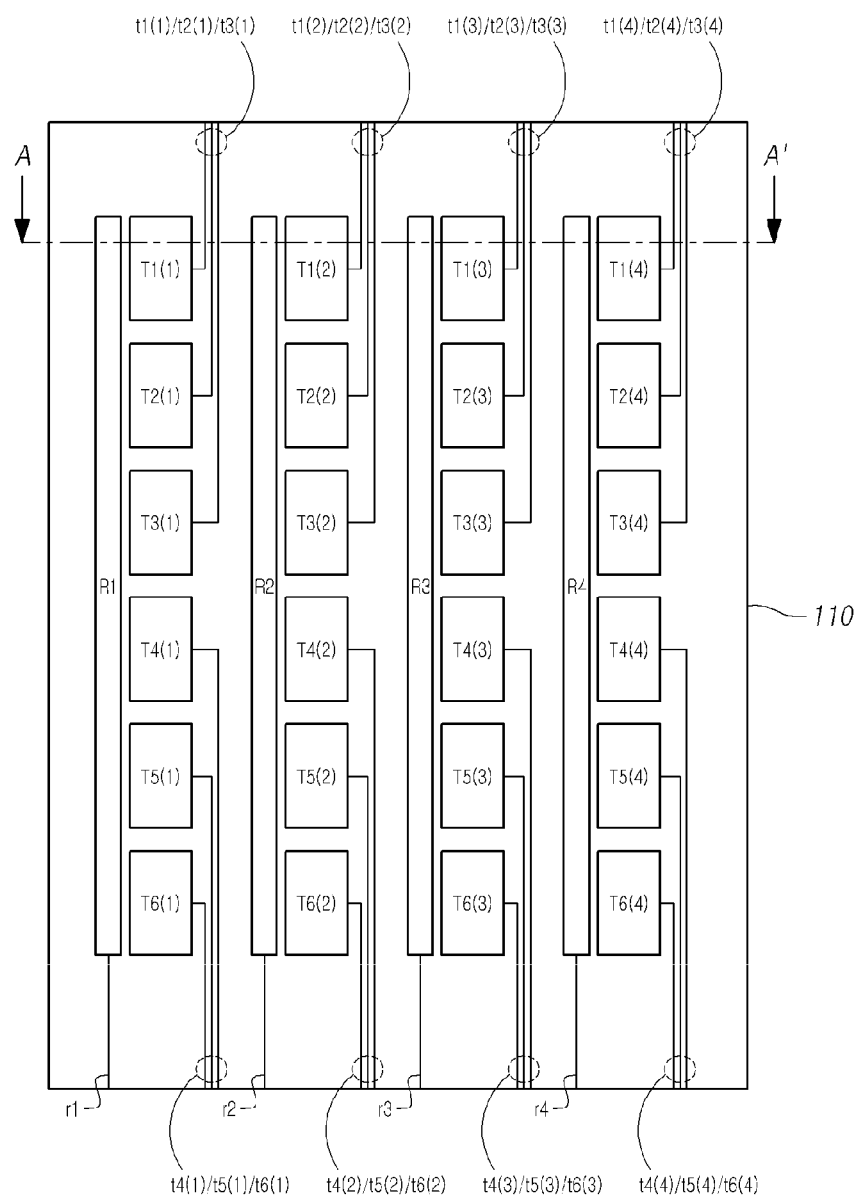
FIG. 4 illustrates a signal wire structure of a touch panel according to another embodiment of the present invention.

FIGS. 3 and 4 illustrate two signal wire structures of a touch panel according to embodiments of the present invention.

Referring to FIGS. 3 and 4, the touch panel 110 according to embodiments of the present invention further includes first signal wires t1(1)~t1(4), t2(1)~t2(4), t3(1)~t3(4), t4(1)~t4(4), t5(1)~t5(4), and t6(1)~t6(4) connected to the first electrodes T1(1)~T1(4), T2(1)~T2(4), T3(1)~T3(4), T4(1)~T4(4), T5(1)~T5(4), and T6(1)~T6(4), respectively, and second wires r1, r2, r3, and r4 connected to the second electrodes R1, R2, R3, and R4, respectively.

Meanwhile, the signal wire structure of the touch panel 110 may be a two-way wire structure as shown in FIGS. 3 and 4. A part of the first signal wires t1(1)~t1(4), t2(1)~t2(4), t3(1)~t3(4), t4(1)~t4(4), t5(1)~t5(4), and t6(1)~t6(4), and the second wires r1, r2, r3, and r4 are formed toward one side (↑) of the touch panel 110, and the other part of them are formed toward another side (↓) of the touch panel 110.

Although the signal wires are shown in FIGS. 3 and 4 as formed in such a two-way wire structure, in other embodiments the structure may be slightly changed.

Referring to FIG. 3, the two-way wire structure may be designed such that the first signal wires t1(1)~t1(4), t2(1)~t2(4), t3(1)~t3(4), t4(1)~t4(4), t5(1)~t5(4), and t6(1)~t6(4) are formed toward the one side (↑) of the touch panel 110, and the second wires r1, r2, r3, and r4 are formed toward the another side (↓) of the touch panel 110.

In some cases, as shown in FIG. 4, the two-way wire structure may be designed such that, among the first signal wires t1(1)~t1(4), t2(1)~t2(4), t3(1)~t3(4), t4(1)~t4(4), t5(1)~t5(4), and t6(1)~t6(4), the first signal wires t1(1)~t1(4), t2(1)~t2(4), and t3(1)~t3(4) connected to the first electrodes at the first to third rows are formed toward the one side (↑) of the touch panel 110, the first signal wires t4(1)~t4(4), t5(1)~t5(4), and t6(1)~t6(4) connected to the first electrodes at the fourth to sixth rows are formed toward the another side (↓) of the touch panel 110, and the second wires r1, r2, r3, and r4 are formed toward the another side (↓) of the touch panel 110.

As mentioned above, when the two-way wire structure is applied under the single layer electrode structure, an applicable touch panel size may be further expanded by overcoming a disadvantage that the single layer electrode structure has a relatively large Resistor Capacitance (RC) value in comparison with the double layer electrode structure and thus a size of the touch panel is restricted.

Figure 14:
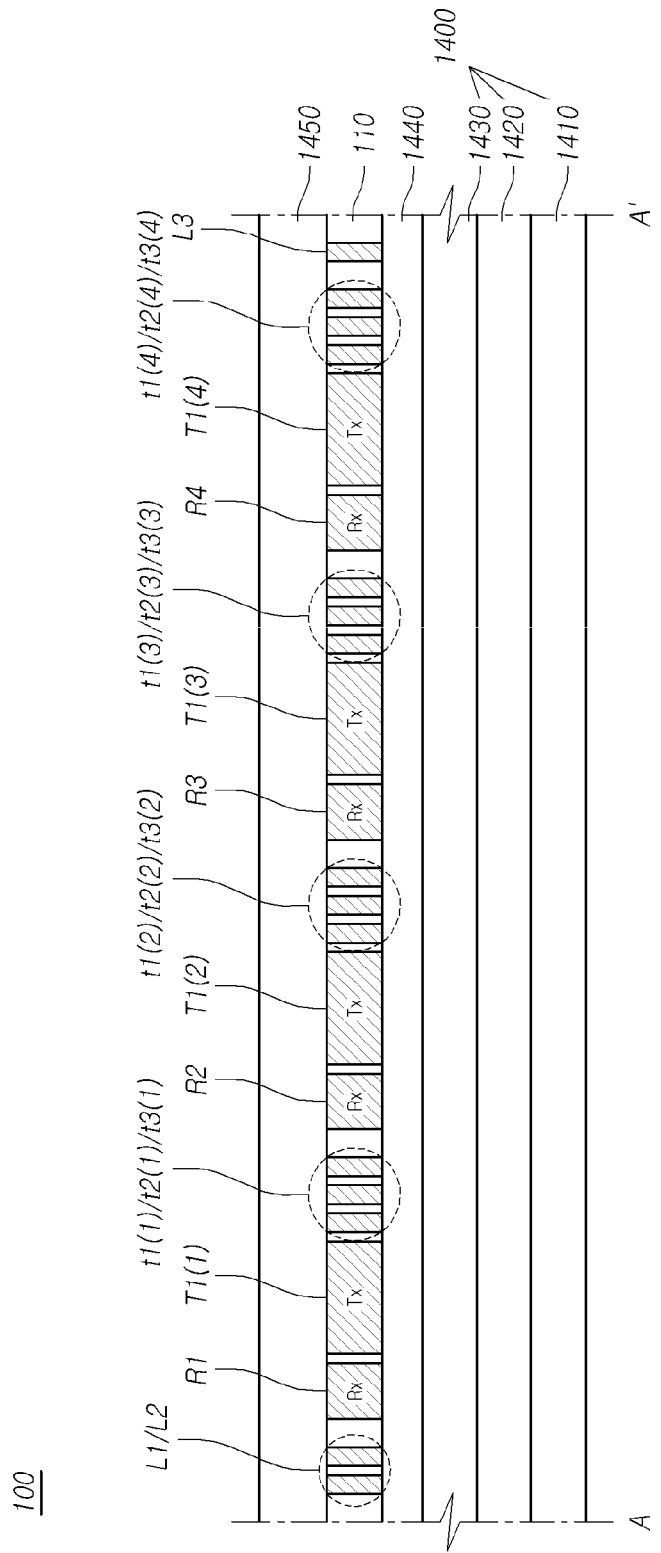
FIG. 14 is a sectional view showing a display device according to embodiments of the present invention.
Figure 15:
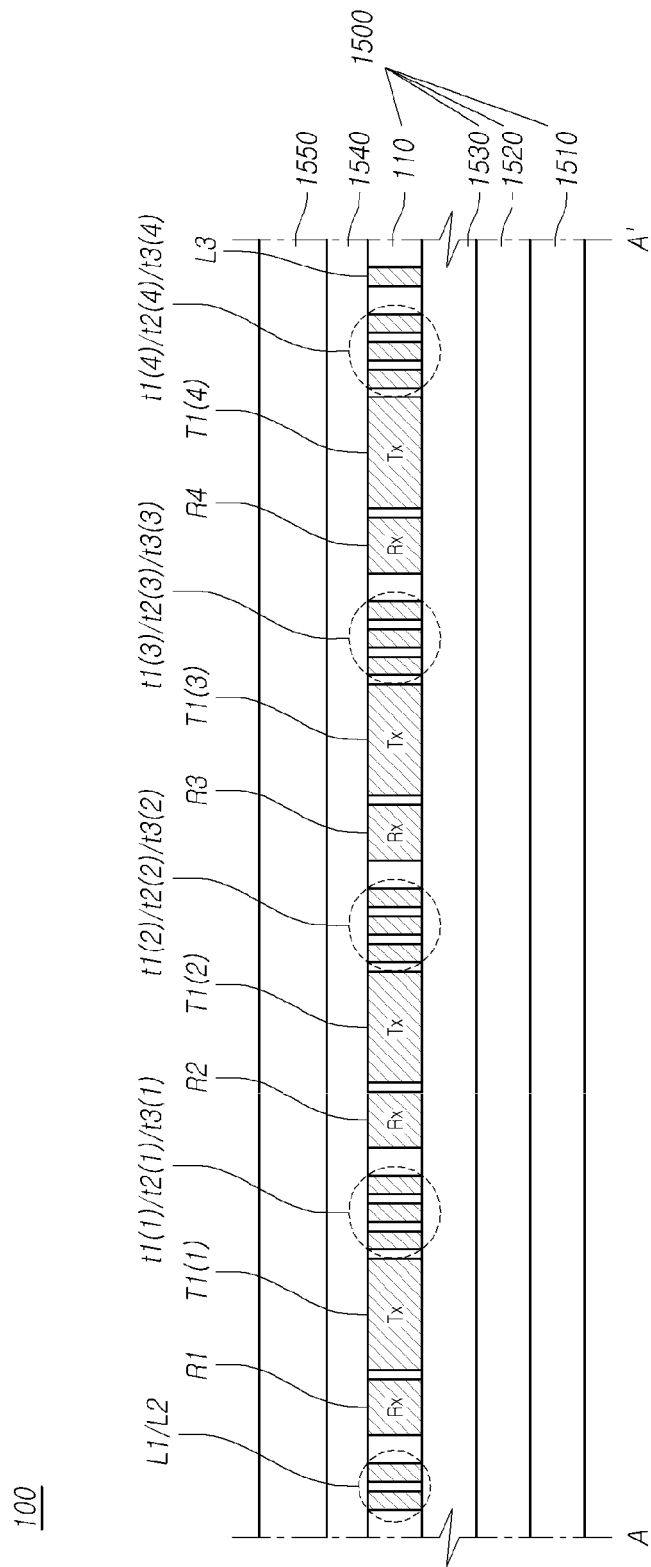
FIG. 15 is another sectional view showing a display device according to embodiments of the present invention.

Meanwhile, line A-A' in FIG. 4 is for describing a stack structure of the display device 100 with reference to FIGS. 14 and 15.

Hereinafter, structures of the FPCBs 120a, 120b, ..., 130 attached to the one side and the another side of the touch panel 110, various signal transmission lines (signal lines, connection lines, additional signal wires, and the like) connected to the signal wires in a circuit, and various pads for the signal transmission lines may be designed based on the electrode structure and the signal wire structure of the touch panel 110.

Hereinafter, one embodiment where the number of application components of the display device 100 is two will be described with reference to FIGS. 5 to 7, and two embodiments where the number of application components of the display device 100 is three will be described with reference to FIGS. 8 to 13.

First, the embodiment where the number of application components of the display device 100 is two will be described with reference to FIGS. 5 to 7. However, hereinafter, for the convenience of the description, the embodiment will be described based on the assumption that one FPCB 130 is attached to the another side of the touch panel 110.

Figure 5:
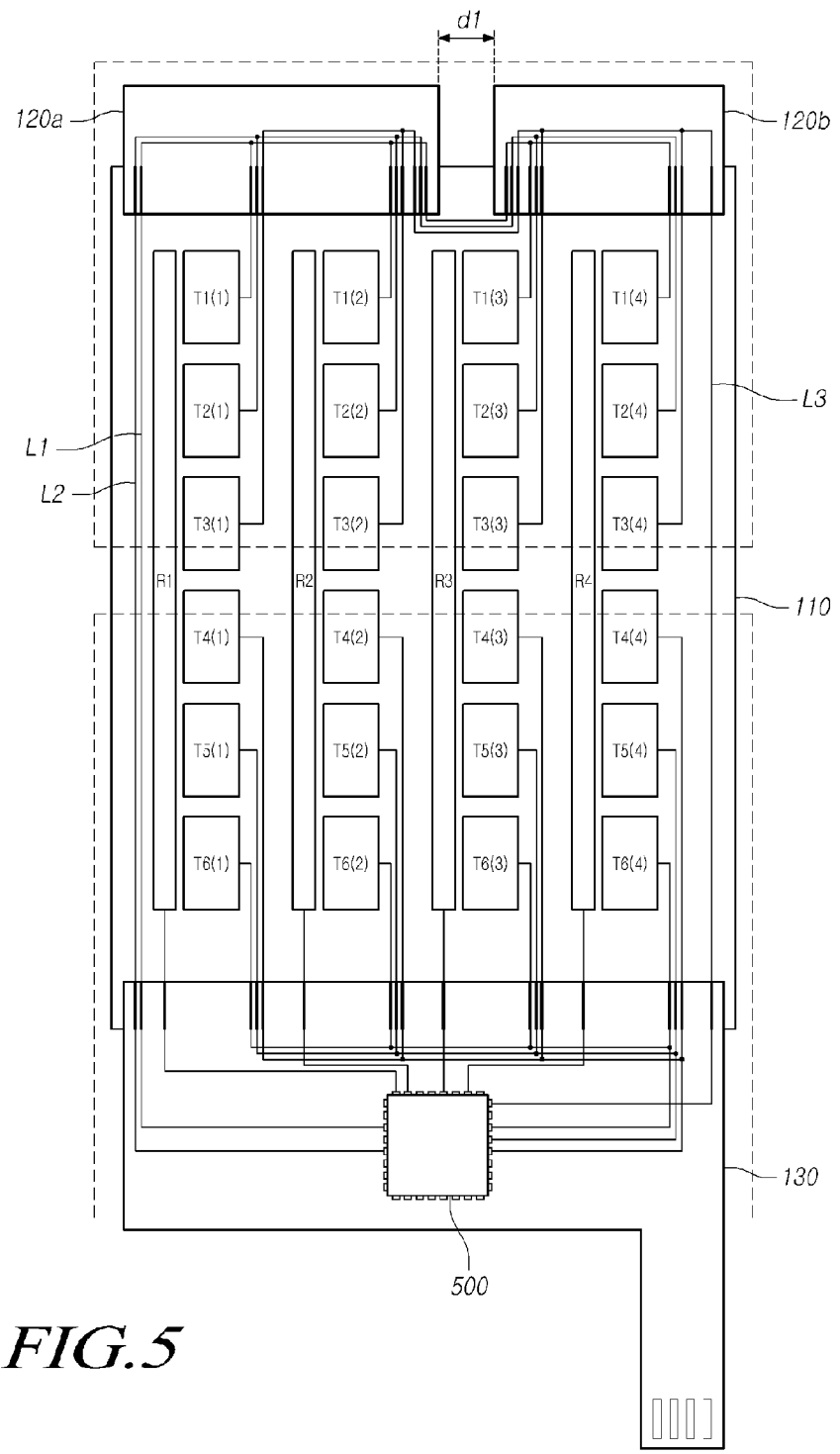
FIG. 5 illustrates a display device according to an embodiment of the present invention.

FIG. 5 illustrates a display device according to an embodiment of the present invention.

Referring to FIG. 5, the display device 100 according to an embodiment of the present invention includes a touch panel 110 in which first electrodes T1(1)~T1(4), T2(1)~T2(4), T3(1)~T3(4), T4(1)~T4(4), T5(1)~T5(4), and T6(1)~T6(4) and second electrodes R1~R4 are formed in a single layer structure, and first signal wires t1(1)~t1(4), t2(1)~t2(4), t3(1)~t3(4), t4(1)~t4(4), t5(1)~t5(4), and t6(1)~t6(4) and second signal wires r1~r4 which are connected to the first electrodes T1(1)~T1(4), T2(1)~T2(4), T3(1)~T3(4), T4(1)~T4(4), T5(1)~T5(4), and T6(1)~T6(4) and the second electrodes R1~R4, respectively, are formed in a two-way wire structure, two FPCBs 120a and 120b attached to one side of the touch panel 110, one FPCB 130 attached to another side of the touch panel 110, and a touch integrated circuit 500 located on the FPCB 130.

As shown in FIG. 5, the two FPCBs 120a and 120b are attached to one side of the touch panel 110 while being spaced apart from each other by a distance d1.

Such a spaced attachment structure of the two FPCBs 120a and 120b is designed with consideration for the installation of an application component MODULE 1 in a space between the two FPCBs 120a and 120b.

The touch panel 110 of the display device 100 exemplified in FIG. 5 has the same electrode structure and the same signal wire structure (two-way wire structure) as those of FIG. 4.

Referring to FIG. 5, the first signal wires t1(1)~t1(4), t2(1)~t2(4), and t3(1)~t3(4) connected to the first electrodes T1(1)~T1(4), T2(1)~T2(4), and T3(1)~T3(4) located at the first, second, and third rows, respectively, are correspondingly connected to the signal lines formed toward the one side (↑) of the touch panel 110 and formed on the two FPCBs 120a and 120b attached to the one side of the touch panel 110.

The signal lines formed on the two FPCBs 120a and 120b attached to the one side of the touch panel 110 are correspondingly connected to each other through additional pads and connection lines for transferring a signal between the FPCBs 120a and 120b.

The signal lines formed on the two FPCBs 120a and 120b, which are connected to each other through the additional pads and the connection lines, are connected to signal lines on the FPCB 130 attached to the another side of the touch panel 110 again through additional signal wires L1, L2, and L3 formed at the outside of the touch panel 110 so as to be connected to the touch integrated circuit 500.

Here, connection lines, through which the signal lines formed at the one side of the touch panel 110 and formed on the two FPCBs 120a and 120b are correspondingly connected to each other, and the additional signal wires L1, L2, and L3 formed at the outside of the touch panel 110 are formed of the same material as that of the electrode.

That is, all of the signal transmission lines formed in the touch panel 110, including the signal wires connected to the first electrodes and the second electrodes, are formed of the same material as that of the electrode.

Meanwhile, the first signal wires t4(1)~t4(4), t5(1)~t5(4), and t6(1)~t6(4) connected to the first electrodes T4(1)~T4(4), T5(1)~T5(4), and T6(1)~T6(4) located at the fourth, fifth, and sixth rows, respectively, may be connected to the touch integrated circuit 500 through the signal lines located on the FPCB 130 attached to the another side of the touch panel 110.

The second signal wires r1, r2, r3, and r4 connected to the second electrodes R1, R2, R3, and R4, respectively, may be connected to the touch integrated circuit 500 through the signal lines located on the FPCB 130 attached to the another side of the touch panel 110.

The signal transmission line connection structures for boxes drawn by dotted lines at one side and another side of the touch panel 110 of FIG. 5 will be described in more detail with reference to FIGS. 6 and 7.

Figure 6:
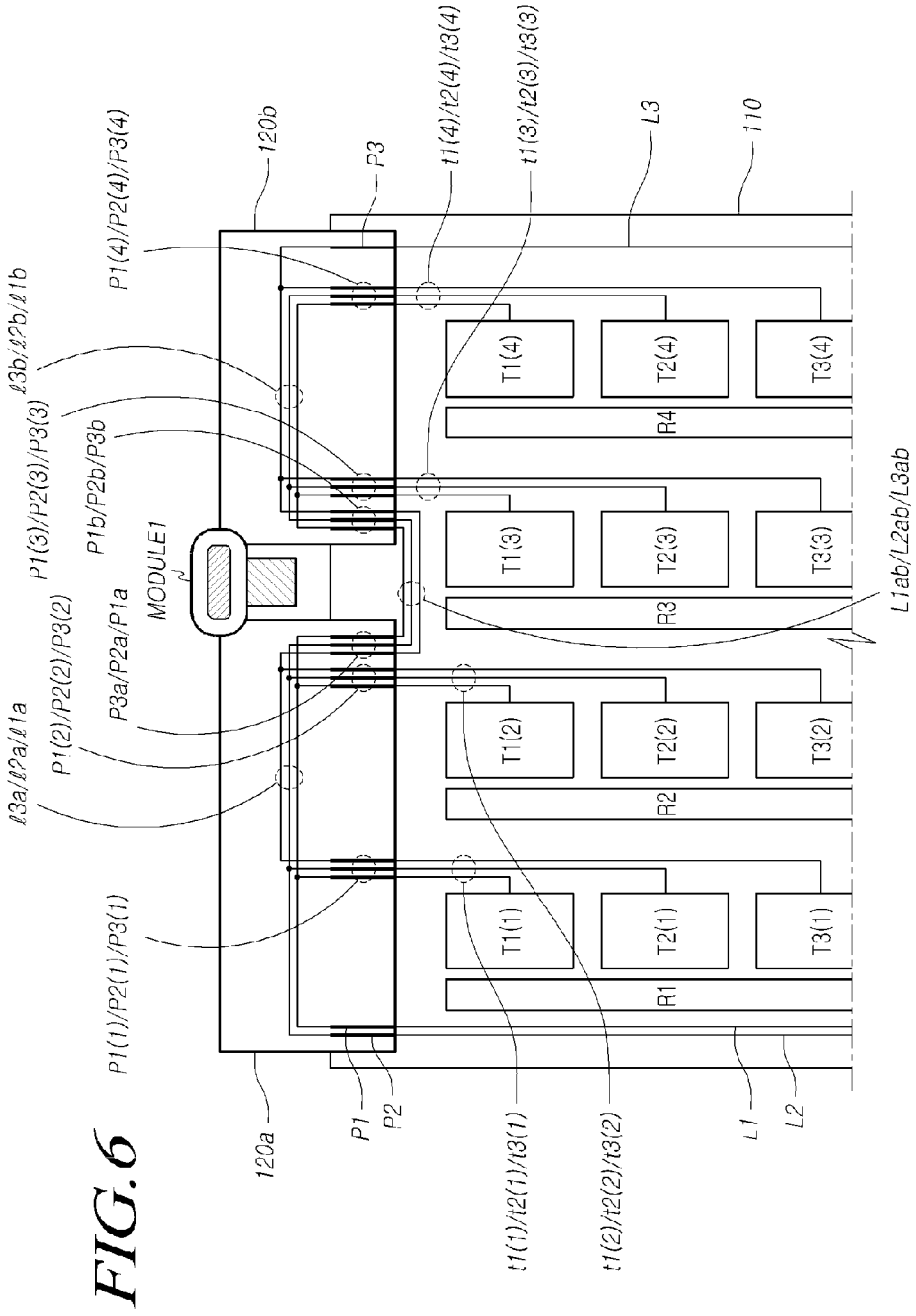
FIG. 6 illustrates a display device according to an embodiment of the present invention in detail.

FIG. 6 illustrates a part of the one side (an opposite side to the touch integrated circuit) of the touch panel 110 of the display device 100 according to an embodiment of the present invention in detail.

Referring to FIG. 6, in order to secure an installation space of an application component MODULE 1 such as a camera module, a speaker module, a sensor module, and the like, the two FPCBs 120a and 120b attached to the one side of the touch panel 110 are spaced apart from each other by a distance d1.

As shown in FIG. 6, a connection structure for various signal transmission lines, including signal lines in the two FPCBs 120a and 120b attached to the touch panel 110 such that they are spaced apart from each other, and additional pads and connection lines for connecting the signal lines in the two FPCBs 120a and 120b, will be described below.

Referring to FIG. 6, among the first electrodes T1(1)~T1(4), T2(1)~T2(4), and T3(1)~T3(4) located at the first, second, and third rows, the first signal wires t1(1), t2(1), and t3(1) connected to the first electrodes T1(1), T2(1), and T3(1) located at the first column are correspondingly connected to signal lines l1a, l2a, and l3a formed on the first FPCB 120a through pads P1(1), P2(1), and P3(1) formed at the one side of the touch panel 110.

That is, the first signal wire t1(1) connected to the first electrode T1(1) is connected to the signal line l1a formed on the first FPCB 120a through the pad P1(1), the first signal wire t2(1) connected to the first electrode T2(1) is connected to the signal line l2a formed on the first FPCB 120a through the pad P2(1), and the first signal wire t3(1) connected to the first electrode T3(1) is connected to the signal line l3a formed on the first FPCB 120a through the pad P3(1).

Among the first electrodes T1(1)~T1(4), T2(1)~T2(4), and T3(1)~T3(4) located at the first, second, and third rows, the first signal wires t1(2), t2(2), and t3(2) connected to the first electrodes T1(2), T2(2), and T3(2) located at the second column are correspondingly connected to signal lines l1a, l2a, and l3a formed on the first FPCB 120a through pads P1(2), P2(2), and P3(2) formed at the one side of the touch panel 110.

That is, the first signal wire t1(2) connected to the first electrode T1(2) is connected to the signal line l1a formed on the first FPCB 120a through the pad P1(2), the first signal wire t2(2) connected to the first electrode T2(2) is connected to the signal line l2a formed on the first FPCB 120a through the pad P2(2), and the first signal wire t3(2) connected to the first electrode T3(2) is connected to the signal line l3a formed on the first FPCB 120a through the pad P3(2).

Among the first electrodes T1(1)~T1(4), T2(1)~T2(4), and T3(1)~T3(4) located at the first, second, and third rows, the first signal wires t1(3), t2(3), and t3(3) connected to the first electrodes T1(3), T2(3), and T3(3) located at the third column are correspondingly connected to signal lines l1b, l2b, and l3b formed on the second FPCB 120b through pads P1(3), P2(3), and P3(3) formed at the one side of the touch panel 110.

That is, the first signal wire t1(3) connected to the first electrode T1(3) is connected to the signal line l1b formed on the second FPCB 120b through the pad P1(3), the first signal wire t2(3) connected to the first electrode T2(3) is connected to the signal line l2b formed on the second FPCB 120b through the pad P2(3), and the first signal wire t3(3) connected to the first electrode T3(3) is connected to the signal line l3b formed on the second FPCB 120b through the pad P3(3).

Among the first electrodes T1(1)~T1(4), T2(1)~T2(4), and T3(1)~T3(4) located at the first, second, and third rows, the first signal wires t1(4), t2(4), and t3(4) connected to the first electrodes T1(4), T2(4), and T3(4) located at the fourth column are correspondingly connected to signal lines l1b, l2b, and l3b formed on the second FPCB 120b through pads P1(4), P2(4), and P3(4) formed at the one side of the touch panel 110.

That is, the first signal wire t1(4) connected to the first electrode T1(4) is connected to the signal line l1b formed on the second FPCB 120b through the pad P1(4), the first signal wire t2(4) connected to the first electrode T2(4) is connected to the signal line l2b formed on the second FPCB 120b through the pad P2(4), and the first signal wire t3(4) connected to the first electrode T3(4) is connected to the signal line l3b formed on the second FPCB 120b through the pad P3(4).

Such a signal transmission line connection structure for each column will be described again below, with reference to the connections for each row.

Among the first electrodes T1(1), T1(2), T1(3), and T1(4) located at the first row, the first signal wires t1(1) and t1(2) connected to the first electrodes T1(1) and T1(2) located at the first and second column are connected to the signal line l1a formed on the first FPCB 120a through the pads P1(1) and P1(2) formed at the one side of the touch panel 110, and the first signal wires t1(3) and t1(4) connected to the first electrodes T1(3) and T1(4) located at the third and fourth column are connected to the signal line l1b formed on the second FPCB 120b through the pads P1(3) and P1(4) formed at the one side of the touch panel 110.

The signal line l1a formed on the first FPCB 120a and the signal line l1b formed on the second FPCB 120b are connected to each other in series through the additional pads P1a and P1b and a connection line L1ab formed in the touch panel 110.

The signal line l1a formed on the first FPCB 120a and the signal line l1b formed on the second FPCB 120b, which are connected in series as described above, are also connected to an additional signal wire L1 formed at the outside of the touch panel 110 through a pad P1 formed at the one side of the touch panel 110.

Accordingly, the first electrodes T1(1), T1(2), T1(3), and T1(4) located at the first row can simultaneously receive a driving voltage supplied from the touch integrated circuit 500 through the additional signal wire L1.

Next, among the first electrodes T2(1), T2(2), T2(3), and T2(4) located at the second row, the first signal wires t2(1) and t2(2) connected to the second electrodes T2(1) and T2(2) located at the first and second column are connected to the signal line l2a formed on the first FPCB 120a through the pads P2(1) and P2(2) formed at the one side of the touch panel 110, and the first signal wires t2(3) and t2(4) connected to the first electrodes T2(3) and T2(4) located at the third and fourth column are connected to the signal line l2b formed on the second FPCB 120b through the pads P2(3) and P2(4) formed at the one side of the touch panel 110.

The signal line l2a formed on the first FPCB 120a and the signal line l2b formed on the second FPCB 120b are connected to each other in series through the additional pads P2a and P2b and a connection line L2ab formed in the touch panel 110.

The signal line l2a formed on the first FPCB 120a and the signal line l2b formed on the second FPCB 120b, which are connected in series as described above, are also connected to an additional signal wire L2 formed at the outside of the touch panel 110 through a pad P2 formed at the one side of the touch panel 110.

Accordingly, the first electrodes T2(2), T2(2), T2(3), and T2(4) located at the second row can simultaneously receive a driving voltage supplied from the touch integrated circuit 500 through the additional signal wire L2.

Next, among the first electrodes T3(1), T3(2), T3(3), and T3(4) located at the third row, the first signal wires t3(1) and t3(2) connected to the first electrodes T3(1) and T3(2) located at the first and second column are connected to the signal line l3a formed on the first FPCB 120a through the pads P3(1) and P3(2) formed at the one side of the touch panel 110, and the first signal wires t3(3) and t3(4) connected to the first electrodes T3(3) and T3(4) located at the third and fourth column are connected to the signal line l3b formed on the second FPCB 120b through the pads P3(3) and P3(4) formed at the one side of the touch panel 110.

The signal line l3a formed on the first FPCB 120a and the signal line l3b formed on the second FPCB 120b are connected to each other in series through the additional pads P3a and P3b and a connection line L3ab formed in the touch panel 110.

The signal line l3a formed on the first FPCB 120a and the signal line l3b formed on the second FPCB 120b, which are connected in series as described above, are also connected to an additional signal wire L3 formed at the outside of the touch panel 110 through a pad P3 formed at the one side of the touch panel 110.

Accordingly, the first electrodes T3(1), T3(2), T3(3), and T3(4) located at the third row can simultaneously receive a driving voltage supplied from the touch integrated circuit 500 through the additional signal wire L3.

Figure 7:
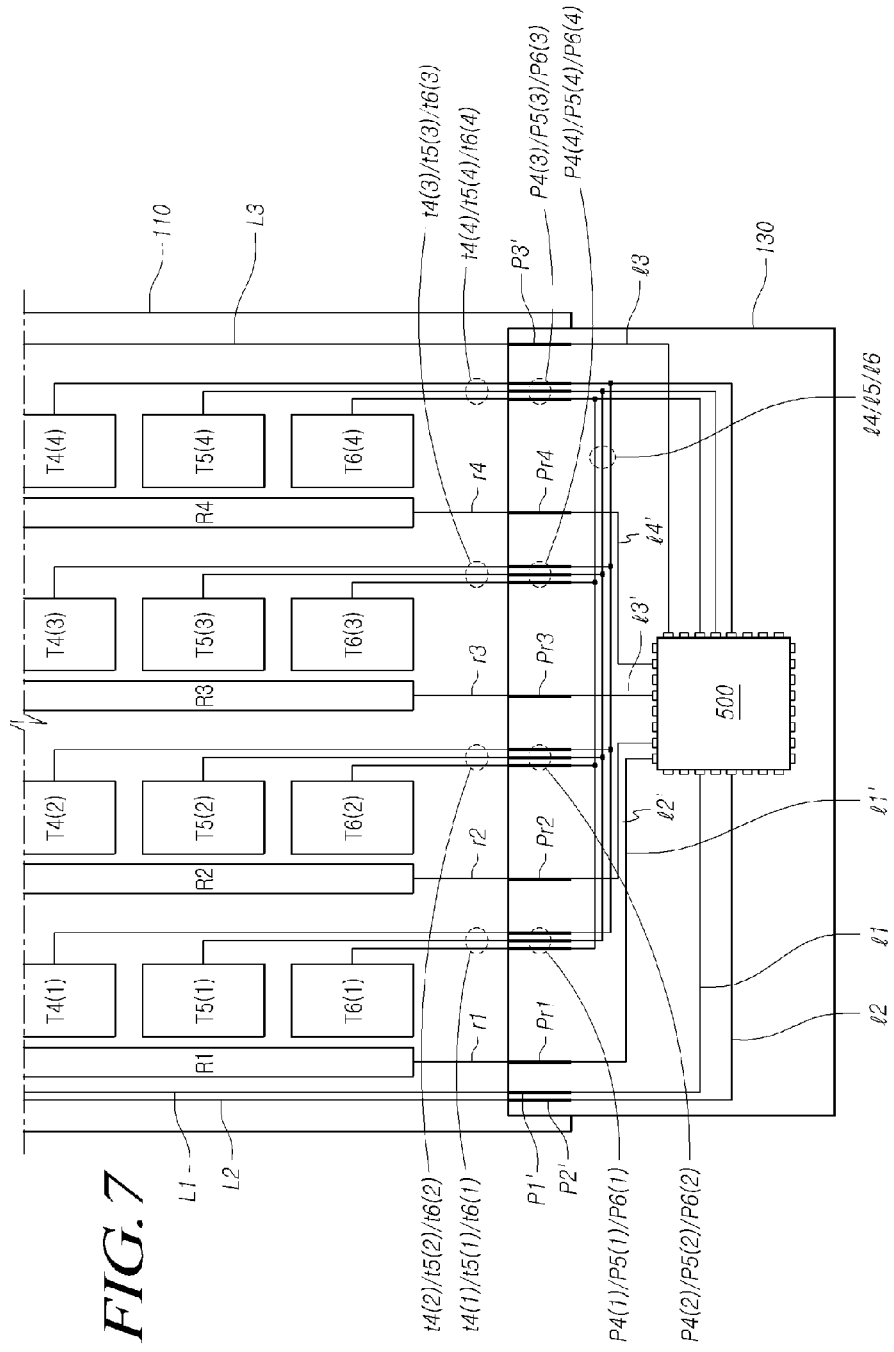
FIG. 7 illustrates a display device according to another embodiment of the present invention in detail.

FIG. 7 illustrates a part of the another side (a side where the touch integrated circuit is located) of the touch panel 110 of the display device 100 according to an embodiment of the present invention in detail.

Referring to FIG. 7, the additional signal wires L1, L2, and L3 connected to the pads P1, P2, and P3 formed at the one side of the touch panel 110 are connected to signal lines 11, 12, and 13 formed on the FPCB 130 attached to the another side of the touch panel 110 through pads P1', P2', and P3' formed at the another side of the touch panel 110, respectively. The signal lines l1, l2, and l3 are connected to three corresponding pins of a plurality of pins of the touch integrated circuit 500, respectively.

Referring to FIG. 7, the first signal wires t4(1), t4(2), t4(3), and t4(4) connected to the first electrodes T4(1), T4(2), T4(3), and T4(4) located at the fourth row of the touch panel 110 are connected to a signal line l4 formed on the FPCB 130 attached to the another side of the touch panel 110 through the pads P4(1), P4(2), P4(3), and P4(4) formed at the another side of the touch panel 110. The signal line l4 is connected to one corresponding pin among the plurality of pins of the touch integrated circuit 500.

Referring to FIG. 7, the first signal wires t5(1), t5(2), t5(3), and t5(4) connected to the first electrodes T5(1), T5(2), T5(3), and T5(4) located at the fifth row of the touch panel 110 are connected to a signal line l5 formed on the FPCB 130 attached to the another side of the touch panel 110 through the pads P5(1), P5(2), P5(3), and P5(4) formed at the another side of the touch panel 110. The signal line l5 is connected to one corresponding pin among the plurality of pins of the touch integrated circuit 500.

Referring to FIG. 7, the first signal wires t6(1), t6(2), t6(3), and t6(4) connected to the first electrodes T6(1), T6(2), T6(3), and T6(4) located at the sixth row of the touch panel 110 are connected to a signal line l6 formed on the FPCB 130 attached to the another side of the touch panel 110 through the pads P6(1), P6(2), P6(3), and P6(4) formed at the another side of the touch panel 110. The signal line l6 is connected to one corresponding pin among the plurality of pins of the touch integrated circuit 500.

Referring to FIG. 7, the second signal wires r1, r2, r3, and r4 connected to the second electrodes R1, R2, R3, and R4 vertically formed on the touch panel 110 are correspondingly connected to signal lines l1', l2', l3', and l4' formed on the FPCB 130 attached to the another side of the touch panel 110 through the pads Pr1, Pr2, Pr3, and Pr4 formed at the another side of the touch panel 110. The signal lines l1', l2', l3', and l4' are connected to four corresponding pins among the plurality of pins of the touch integrated circuit 500, respectively.

Hereinabove, various signal transmission line connection structures have been described with respect to a case where the number of application components MODULE 1 is one, that is, a case where the two FPCBs 120a and 120b are attached to the one side of the touch panel 110 with reference to FIGS. 5 to 7.

Hereinafter, various signal transmission line connection structures will be described with respect to a case where the number of application components MODULE 1 is two, that is, a case where the three FPCBs 120a, 120b, and 120c are attached to the one side of the touch panel 110 with reference to FIGS. 8 to 10.

Figure 8:
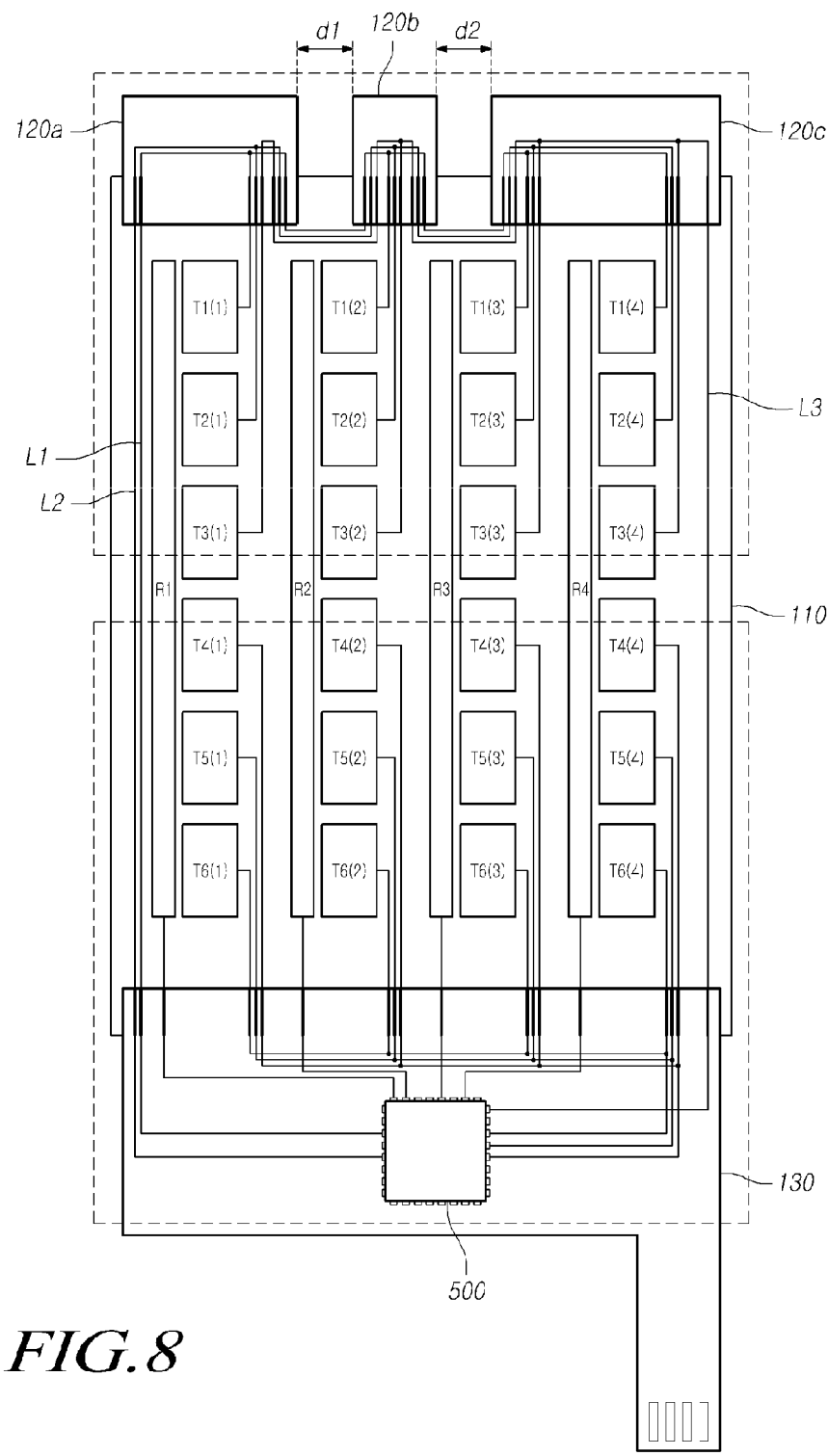
FIG. 8 illustrates a display device according to another embodiment of the present invention.

FIG. 8 illustrates a display device according to an embodiment of the present invention.

Referring to FIG. 8, the display device 100 according to another embodiment of the present invention includes a touch panel 110 in which first electrodes T1(1)~T1(4), T2(1)~T2(4), T3(1)~T3(4), T4(1)~T4(4), T5(1)~T5(4), and T6(1)~T6

(4) and second electrodes R1-R4 are formed in a single layer structure, and first signal wires t1(1)~t1(4), t2(1)~t2(4), t3(1)~t3(4), t4(1)~t4(4), t5(1)~t5(4), and t6(1)~t6(4) and second signal wires r1~r4 which are connected to the first electrodes T1(1)~T1(4), T2(1)~T2(4), T3(1)~T3(4), T4(1)~T4(4), T5(1)~T5(4), and T6(1)~T6(4) and the second electrodes R1-R4, respectively, are formed in a two-way wire structure, three FPCBs 120a, 120b, and 120c attached to one side of the touch panel 110, one FPCB 130 attached to the another side of the touch panel 110, and a touch integrated circuit 500 located on the FPCB 130.

As shown in FIG. 8, the three FPCBs 120a, 120b, and 120c attached to one side of the touch panel 110 are spaced apart from each other by predetermined distances. That is, the first FPCB 120a and the second FPCB 120b are attached to the touch panel 110 to be spaced apart from each other by a distance d1, and the second FPCB 120b and the third FPCB 120c are attached to the touch panel 110 to be spaced apart from each other by a distance d2.

Such a spaced attachment structure of the three FPCBs 120a, 120b, and 120c is designed with consideration for the installation of two application components MODULE 1 and MODULE 2 in the spaces between the three FPCBs 120a, 120b, and 120c.

The touch panel 110 of the display device 100 exemplified in FIG. 8 has the same electrode structure and the same signal wire structure (two-way wire structure) as those of FIG. 4.

Referring to FIG. 8, the first signal wires t1(1)~t1(4), t2(1)~t2(4), and t3(1)~t3(4) connected to the first electrodes T1(1)~T1(4), T2(1)~T2(4), and T3(1)~T3(4) located at the first, second, and third rows, respectively, are correspondingly connected to the signal lines formed toward the one side (↑) of the touch panel 110 and formed on the three FPCBs 120a, 120b, and 120c attached to the one side of the touch panel 110.

The signal lines formed on the three FPCBs 120a, 120b, and 120c attached to the one side of the touch panel 110 are correspondingly connected to each other through additional pads and connection lines for transferring a signal between the three FPCBs 120a, 120b, and 120c.

The signal lines formed on the three FPCBs 120a, 120b, and 120c, which are connected to each other through the additional pads and the connection lines, are connected to signal lines on the FPCB 130 attached to the another side of the touch panel 110 again through additional signal wires L1, L2, and L3 formed at the outside of the touch panel 110 so as to be connected to the touch integrated circuit 500.

Here, connection lines, through which the signal lines formed at the one side of the touch panel 110 and formed on the three FPCBs 120a, 120b, and 120c are correspondingly connected to each other, and the additional signal wires L1, L2, and L3 formed at the outside of the touch panel 110 are formed of the same material as that of the electrode.

That is, the signal transmission lines formed in the touch panel 110, including the signal wires connected to the first electrodes and the second electrodes, are formed of the same material as that of the electrode.

Meanwhile, the first signal wires t4(1)~t4(4), t5(1)~t5(4), and t6(1)~t6(4) connected to the first electrodes T4(1)~T4(4), T5(1)~T5(4), and T6(1)~T6(4) located at the fourth, fifth, and sixth rows, respectively, may be connected to the touch integrated circuit 500 through the signal lines located on the FPCB 130 attached to the another side of the touch panel 110.

The second signal wires r1, r2, r3, and r4 connected to the second electrodes R1, R2, R3, and R4, respectively, may be connected to the touch integrated circuit 500 through the signal lines located on the FPCB 130 attached to the another side of the touch panel 110.

The signal transmission line connection structure for the box drawn by a dotted line at the one side of the touch panel 110 of FIG. 8 will be described in more detail with reference to FIG. 9. However, the signal transmission line connection structure for the box drawn by a dotted line at the another side of the touch panel 110 of FIG. 8 is the same as that shown by and described with reference to FIG. 7, so a description thereof is not separately provided.

Figure 9:
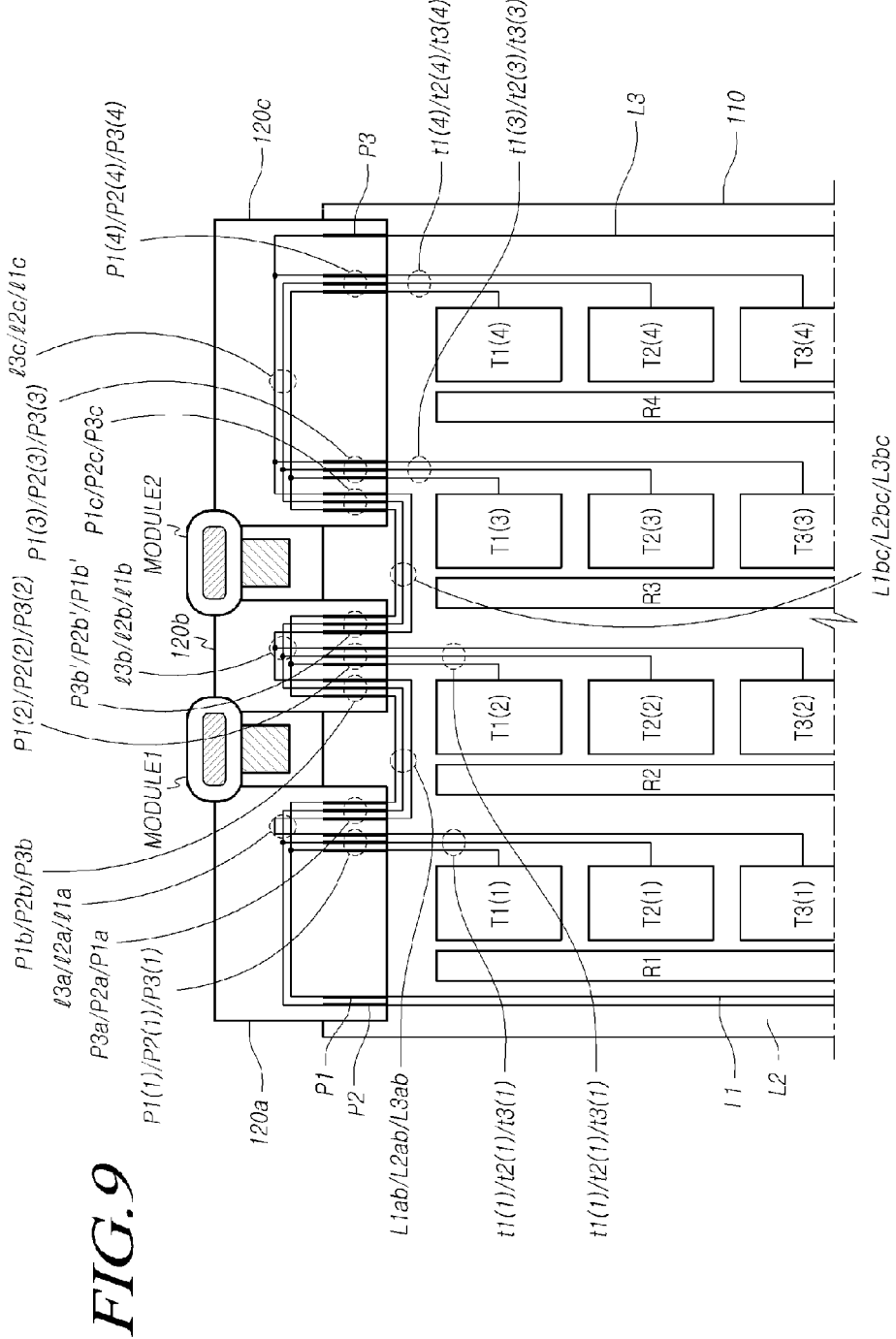
FIG. 9 illustrates a display device according to another embodiment of the present invention in detail.

FIG. 9 illustrates a display device according to another embodiment of the present invention in detail.

Referring to FIG. 9, in order to provide installation spaces for two application components MODULE 1 and MODULE 2 such as a camera module, a speaker module, a sensor module, and the like, the three FPCBs 120a, 120b, and 120c attached to the one side of the touch panel 110 are spaced apart from each other by predetermined distances.

As shown in FIG. 9, a connection structure for various signal transmission lines, including signal lines 11a/12a/13a, 11b/12b/13b, and 11c/12c/13c in the three FPCBs 120a, 120b, and 120c attached to the touch panel 110 such that they are spaced apart from each other, and additional pads P1a/P2a/P3a, P1b/P2b/P3b, P1b'/P2b'/P3b', P1c/P2c/P3c and connection lines L1ab/L2ab/L3ab and L1bc/L2bc/L3bc for connecting the signal lines 11a/12a/13a, 11b/12b/13b, and 11c/12c/13c in the three FPCBs 120a, 120b, and 120c, will be described below.

Referring to FIG. 9, among the first electrodes T1(1)~T1(4), T2(1)~T2(4), and T3(1)~T3(4) located at the first, second, and third rows, the first signal wires t1(1), t2(1), and t3(1) connected to the first electrodes T1(1), T2(1), and T3(1) located at the first column are correspondingly connected to signal lines 11a, 12a, and 13a formed on the first FPCB 120a through pads P1(1), P2(1), and P3(1) formed at the one side of the touch panel 110.

That is, the first signal wire t1(1) connected to the first electrode T1(1) is connected to the signal line 11a formed on the first FPCB 120a through the pad P1(1), the first signal wire t2(1) connected to the first electrode T2(1) is connected to the signal line 12a formed on the first FPCB 120a through the pad P2(1), and the first signal wire t3(1) connected to the first electrode T3(1) is connected to the signal line 13a formed on the first FPCB 120a through the pad P3(1).

Among the first electrodes T1(1)~T1(4), T2(1)~T2(4), and T3(1)~T3(4) located at the first, second, and third rows, the first signal wires t1(2), t2(2), and t3(2) connected to the first electrodes T1(2), T2(2), and T3(2) located at the second column are correspondingly connected to signal lines 11b, 12b, and 13b formed on the second FPCB 120b through pads P1(2), P2(2), and P3(2) formed at the one side of the touch panel 110.

That is, the first signal wire t1(2) connected to the first electrode T1(2) is connected to the signal line 11a formed on the first FPCB 120a through the pad P1(2), the first signal wire t2(2) connected to the first electrode T2(2) is connected to the signal line 12a formed on the first FPCB 120a through the pad P2(2), and the first signal wire t3(2) connected to the first electrode T3(2) is connected to the signal line 13a formed on the first FPCB 120a through the pad P3(2).

Among the first electrodes T1(1)~T1(4), T2(1)~T2(4), and T3(1)~T3(4) located at the first, second, and third rows, the first signal wires t1(3), t2(3), and t3(3) connected to the first electrodes T1(3), T2(3), and T3(3) located at the third column are correspondingly connected to signal lines 11c, 12c, and 13c formed on the third FPCB 120*c* through pads P1(3), P2(3), and P3(3) formed at the one side of the touch panel 110.

That is, the first signal wire t1(3) connected to the first electrode T1(3) is connected to the signal line l1*c* formed on the third FPCB 120*c* through the pad P1(3), the first signal wire t2(3) connected to the first electrode T2(3) is connected to the signal line l2*c* formed on the third FPCB 120*c* through the pad P2(3), and the first signal wire t3(3) connected to the first electrode T3(3) is connected to the signal line l3*c* formed on the third FPCB 120*c* through the pad P3(3).

Among the first electrodes T1(1)~T1(4), T2(1)~T2(4), and T3(1)~T3(4) located at the first, second, and third rows, the first signal wires t1(4), t2(4), and t3(4) connected to the first electrodes T1(4), T2(4), and T3(4) located at the fourth column are correspondingly connected to signal lines l1*c*, l2*c*, and l3*c* formed on the third FPCB 120*c* through pads P1(4), P2(4), and P3(4) formed at the one side of the touch panel 110.

That is, the first signal wire t1(4) connected to the first electrode T1(4) is connected to the signal line l1*c* formed on the third FPCB 120*c* through the pad P1(4), the first signal wire t2(4) connected to the first electrode T2(4) is connected to the signal line l2*c* formed on the third FPCB 120*c* through the pad P2(4), and the first signal wire t3(4) connected to the first electrode T3(4) is connected to the signal line l3*c* formed on the third FPCB 120*c* through the pad P3(4).

Such a signal transmission line connection structure for each column will be described again below, with reference to the connections for each row.

Among the first electrodes T1(1), T1(2), T1(3), and T1(4) located at the first row, the first signal wire t1(1) connected to the first electrode T1(1) located at the first column is connected to the signal line l1*a* formed on the first FPCB 120*a* through the pad P1(1) formed at the one side of the touch panel 110, the first signal wire t1(2) connected to the first electrode T1(2) located at the second column is connected to the signal line l1*b* formed on the second FPCB 120*b* through the pad P1(2) formed at the one side of the touch panel 110, and the first signal wires t1(3) and t1(4) connected to the first electrodes T1(3) and T1(4) located at the third and fourth columns are connected to the signal line l1*c* formed on the third FPCB 120*c* through the pads P1(3) and P1(4) formed at the one side of the touch panel 110.

The signal line l1*a* formed on the first FPCB 120*a* and the signal line l1*b* formed on the second FPCB 120*b* are connected to each other through the additional pads P1*a* and P1*b* and a connection line L1*ab* formed in the touch panel 110. Opposite ends of the signal line l1*b* formed on the second FPCB 120*b* are connected to the additional pads P1*b* and P1*b*' formed in the touch panel 110, respectively. Further, the signal line l1*b* formed on the second FPCB 120*b* and the signal line l1*c* formed on the third FPCB 120*c* are connected to each other through the additional pads P1*b*' and P1*c* and a connection line L1*bc* formed in the touch panel 110.

The signal line l1*a* formed on the first FPCB 120*a*, the signal line l1*b* formed on the second FPCB 120*b*, and the signal line l1*c* formed on the third FPCB 120*c* are connected to each other in series through the above-described connection structures P1*a*-L1*ab*-P1*b*, P1*b*-l1*b*-P1*b*', and P1*b*'-L1*bc*-P1*c* so as to be connected to the additional signal wire L1 formed at the outside of the touch panel 110 through the pad P1 formed at the one side of the touch panel 110.

Accordingly, the first electrodes T1(1), T1(2), T1(3), and T1(4) located at the first row can simultaneously receive a driving voltage supplied from the touch integrated circuit 500 through the additional signal wire L1.

Next, among the first electrodes T2(1), T2(2), T2(3), and T2(4) located at the second row, the first signal wire t2(1) connected to the first electrode T2(1) located at the first column is connected to the signal line l2*a* formed on the first FPCB 120*a* through the pad P2(1) formed at the one side of the touch panel 110, the first signal wire t2(2) connected to the first electrode T2(2) located at the second column is connected to the signal line l2*b* formed on the second FPCB 120*b* through the pad P2(2) formed at the one side of the touch panel 110, and the first signal wires t2(3) and t2(4) connected to the first electrodes T2(3) and T2(4) located at the third and fourth columns are connected to the signal line l2*c* formed on the third FPCB 120*c* through the pads P2(3) and P2(4) formed at the one side of the touch panel 110.

The signal line l2*a* formed on the first FPCB 120*a* and the signal line l2*b* formed on the second FPCB 120*b* are connected to each other through the additional pads P2*a* and P2*b* and a connection line L2*ab* formed in the touch panel 110. Opposite ends of the signal line l2*b* formed on the second FPCB 120*b* are connected to the additional pads P2*b* and P2*b*' formed in the touch panel 110, respectively. Further, the signal line l2*b* formed on the second FPCB 120*b* and the signal line l2*c* formed on the third FPCB 120*c* are connected to each other through the additional pads P2*b*' and P2*c* and a connection line L2*bc* formed in the touch panel 110.

The signal line l2*a* formed on the first FPCB 120*a*, the signal line l2*b* formed on the second FPCB 120*b*, and the signal line l2*c* formed on the third FPCB 120*c* are connected to each other in series through the above-described connection structures P2*a*-L2*ab*-P2*b*, P2*b*-l2*b*-P2*b*', and P2*b*'-L2*bc*-P2*c* so as to be connected to the additional signal wire L2 formed at the outside of the touch panel 110 through the pad P2 formed at the one side of the touch panel 110.

Accordingly, the first electrodes T2(2), T2(2), T2(3), and T2(4) located at the second row can simultaneously receive a driving voltage supplied from the touch integrated circuit 500 through the additional signal wire L2.

Next, among the first electrodes T3(1), T3(2), T3(3), and T3(4) located at the third row, the first signal wire t3(1) connected to the first electrode T3(1) located at the first column is connected to the signal line l3*a* formed on the first FPCB 120*a* through the pad P3(1) formed at the one side of the touch panel 110, the first signal wire t3(2) connected to the first electrode T3(2) located at the second column is connected to the signal line l3*b* formed on the second FPCB 120*b* through the pad P3(2) formed at the one side of the touch panel 110, and the first signal wires t3(3) and t3(4) connected to the first electrodes T3(3) and T3(4) located at the third and fourth columns are connected to the signal line l3*c* formed on the third FPCB 120*c* through the pads P3(3) and P3(4) formed at the one side of the touch panel 110.

The signal line l3*a* formed on the first FPCB 120*a* and the signal line l3*b* formed on the second FPCB 120*b* are connected to each other through the additional pads P3*a* and P3*b* and a connection line L3*ab* formed in the touch panel 110. Opposite ends of the signal line l3*b* formed on the second FPCB 120*b* are connected to the additional pads P3*b* and P3*b*' formed in the touch panel 110, respectively. Further, the signal line l3*b* formed on the second FPCB 120*b* and the signal line l3*c* formed on the third FPCB 120*c* are connected to each other through the additional pads P3*b*' and P3*c* and a connection line L3*bc* formed in the touch panel 110.

The signal line l3*a* formed on the first FPCB 120*a*, the signal line l3*b* formed on the second FPCB 120*b*, and the signal line l3*c* formed on the third FPCB 120*c* are connected to each other in series through the above-described connection structures P3*a*-L3*ab*-P3*b*, P3*b*-l3*b*-P3*b*', and P3*b*'-L3*bc*-

P3c so as to be connected to the additional signal wire L3 formed at the outside of the touch panel 110 through the pad P3 formed at the one side of the touch panel 110.

Accordingly, the first electrodes T3(1), T3(2), T3(3), and T3(4) located at the third row can simultaneously receive a driving voltage supplied from the touch integrated circuit 500 through the additional signal wire L3.

Meanwhile, as shown in FIG. 9, the number of additional pads formed at the attachment areas of the three FPCBs 120a, 120b, and 120c attached to the one side of the touch panel 110 are three, six, and three, respectively. That is, the additional pads formed at the attachment area of the first FPCB 120a correspond to P1a, P2a, and P3a, so the number of the additional pads is three. The additional pads formed at the attachment area of the second FPCB 120b correspond to P1b, P2b, P3b, P1b', P2b', and P3b', so the number of the additional pads is six. The additional pads formed at the attachment area of the third FPCB 120c correspond to P1c, P2c, and P3c, so the number of the additional pads is three.

As described above, the numbers of the additional pads formed at the respective attachment areas of the three FPCBs 120a, 120b, and 120c attached to the one side of the touch panel 110 are three, six, and three, respectively, so it can be seen that the respective numbers of the additional pads are different from each other.

Further, as the number of FPCBs attached to the one side of the touch panel 110 increases, the number of additional pads increases in proportion to the increased number of FPCBs. Such an increased number of additional pads increases the difficulty in the design and the manufacturing process of the display device 100 including the touch panel 110 and the like, and increases manufacturing costs thereof.

A pattern for the connection lines L1ab/L2ab/L3ab and L1bc/L2bc/L3bc between the FPCBs 120a, 120b, and 120c in the display device 100 suitable for use with the embodiment described above with reference to FIGS. 8 and 9 will be described with reference to FIG. 10. However, a case where four FPCBs 120a, 120b, 120c, and 120d are attached to the one side of the touch panel 110 is illustrated in FIG. 10 in order to more clearly describe the pattern, and the connection line pattern will be described with reference to the illustrated case.

FIG. 10 illustrates a connection line pattern between FPCBs in a display device according to another embodiment of the present invention;

Referring to FIG. 10, when four FPCBs 120a, 120b, 120c, and 120d are attached to the one side of the touch panel included in the display device 100 according to another embodiment of the present invention, the connection lines L1ab/L2ab/L3ab formed between the first FPCB 120a and the second FPCB 120b in the touch panel 110, the connection lines L1bc/L2bc/L3bc formed between the second FPCB 120b and the third FPCB 120c in the touch panel 110, and the connection lines L1cd/L2cd/L3cd formed between the third FPCB 120c and the fourth FPCB 120d in the touch panel 110 are formed in the same pattern.

According to the connection line pattern, the number of additional pads (6 pads) formed at an attachment area of each of the second FPCB 120b and the third FPCB 120c in the touch panel 110 is larger than the number of additional pads (3 pads) formed at an attachment area of each of the first FPCB 120a and the fourth FPCB 120d in the touch panel 110.

Meanwhile, referring to FIGS. 9 and 10, as the number of FPCBs attached to the one side of the touch panel 110 increases, the number of additional pads increases in proportion to the increased number of FPCBs. Such an increased number of additional pads increases the difficulty in the design and the manufacturing process of the display device 100 including the touch panel 110 and the like, and increases manufacturing costs thereof.

Accordingly, the display device 100 according to yet another embodiment of the present invention, having a signal transmission line connection structure in which the number of additional pads does not increase although the number of FPCBs attached to the one side of the touch panel 110 increases, will be described below with reference to FIGS. 11 to 13.

Figure 11:
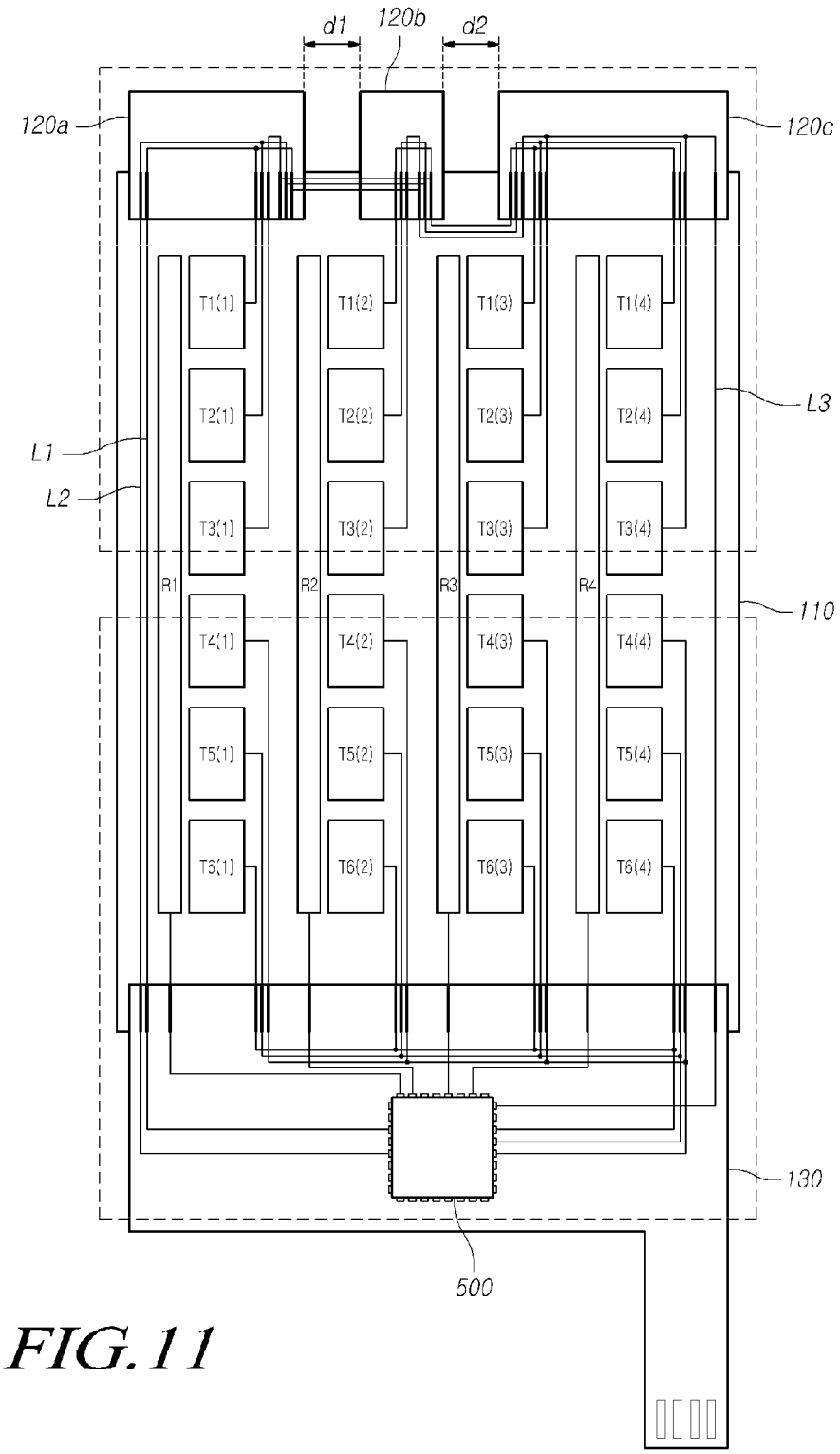
FIG. 11 illustrates a display device according to yet another embodiment of the present invention.

FIG. 11 illustrates a display device according to yet another embodiment of the present invention.

Referring to FIG. 11, the display device 100 according to yet another embodiment of the present invention includes a touch panel 110 in which first electrodes T1(1)~T1(4), T2(1)~T2(4), T3(1)~T3(4), T4(1)~T4(4), T5(1)~T5(4), and T6(1)~T6(4) and second electrodes R1~R4 are formed in a single layer structure, and first signal wires t1(1)~t1(4), t2(1)~t2(4), t3(1)~t3(4), t4(1)~t4(4), t5(1)~t5(4), and t6(1)~t6(4) and second signal wires r1~r4 which are connected to the first electrodes T1(1)~T1(4), T2(1)~T2(4), T3(1)~T3(4), T4(1)~T4(4), T5(1)~T5(4), and T6(1)~T6(4) and the second electrodes R1~R4, respectively, are formed in a two-way wire structure, three FPCBs 120a, 120b, and 120c attached to one side of the touch panel 110, one FPCB 130 attached to the another side of the touch panel 110, and a touch integrated circuit 500 located on the FPCB 130.

As shown in FIG. 11, the three FPCBs 120a, 120b, and 120c attached to the one side of the touch panel 110 are spaced apart from each other by predetermined distances. That is, the first FPCB 120a and the second FPCB 120b are attached to the touch panel 110 to be spaced apart from each other by a distance d1, and the second FPCB 120b and the third FPCB 120c are attached to the touch panel 110 to be spaced apart from each other by a distance d2.

Such a spaced attachment structure of the three FPCBs 120a, 120b, and 120c is designed with consideration for the installation of two application components MODULE 1 and MODULE 2 in the spaces between the three FPCBs 120a, 120b, and 120c. Accordingly, applicability of the product is improved.

The touch panel 110 of the display device 100 exemplified in FIG. 11 has the same electrode structure and the same signal wire structure (two-way wire structure) as those of FIG. 4.

Referring to FIG. 11, the first signal wires t1(1)~t1(4), t2(1)~t2(4), and t3(1)~t3(4) connected to the first electrodes T1(1)~T1(4), T2(1)~T2(4), and T3(1)~T3(4) located at the first, second, and third rows, respectively, are correspondingly connected to the signal lines formed toward the one side (↑) of the touch panel 110 and formed on the three FPCBs 120a, 120b, and 120c attached to the one side of the touch panel 110.

The signal lines formed on the three FPCBs 120a, 120b, and 120c attached to the one side of the touch panel 110 are correspondingly connected to each other through additional pads and connection lines for transferring a signal between the three FPCBs 120a, 120b, and 120c.

The signal lines formed on the three FPCBs 120a, 120b, and 120c, which are connected to each other through the additional pads and the connection lines, are connected to signal lines on the FPCB 130 attached to the another side of the touch panel 110 again through additional signal wires L1, L2, and L3 formed at the outside of the touch panel 110 so as to be connected to the touch integrated circuit 500.

Here, connection lines, through which the signal lines formed at the one side of the touch panel 110 and formed on the three FPCBs 120a, 120b, and 120c are correspondingly connected to each other, and the additional signal wires L1, L2, and L3 formed at the outside of the touch panel 110 are formed of the same material as that of the electrode.

That is, all of the signal transmission lines formed in the touch panel 110, including the signal wires connected to the first electrodes and the second electrodes, are formed of the same material as that of the electrode.

Meanwhile, the first signal wires t4(1)~t4(4), t5(1)~t5(4), and t6(1)~t6(4) connected to the first electrodes T4(1)~T4(4), T5(1)~T5(4), and T6(1)~T6(4) located at the fourth, fifth, and sixth rows, respectively, may be connected to the touch integrated circuit 500 through the signal lines located on the FPCB 130 attached to the another side of the touch panel 110.

The second signal wires r1, r2, r3, and r4 connected to the second electrodes R1, R2, R3, and R4, respectively, may be connected to the touch integrated circuit 500 through the signal lines located on the FPCB 130 attached to the another side of the touch panel 110.

The signal transmission line connection structure for the box drawn by a dotted line at the one side of the touch panel 110 of FIG. 11 will be described in more detail with reference to FIG. 12. However, the signal transmission line connection structure for the box drawn by a dotted line at the another side of the touch panel 110 of FIG. 11 is the same as that shown by and described with reference to FIG. 7, so a description thereof is not separately provided.

Figure 12:
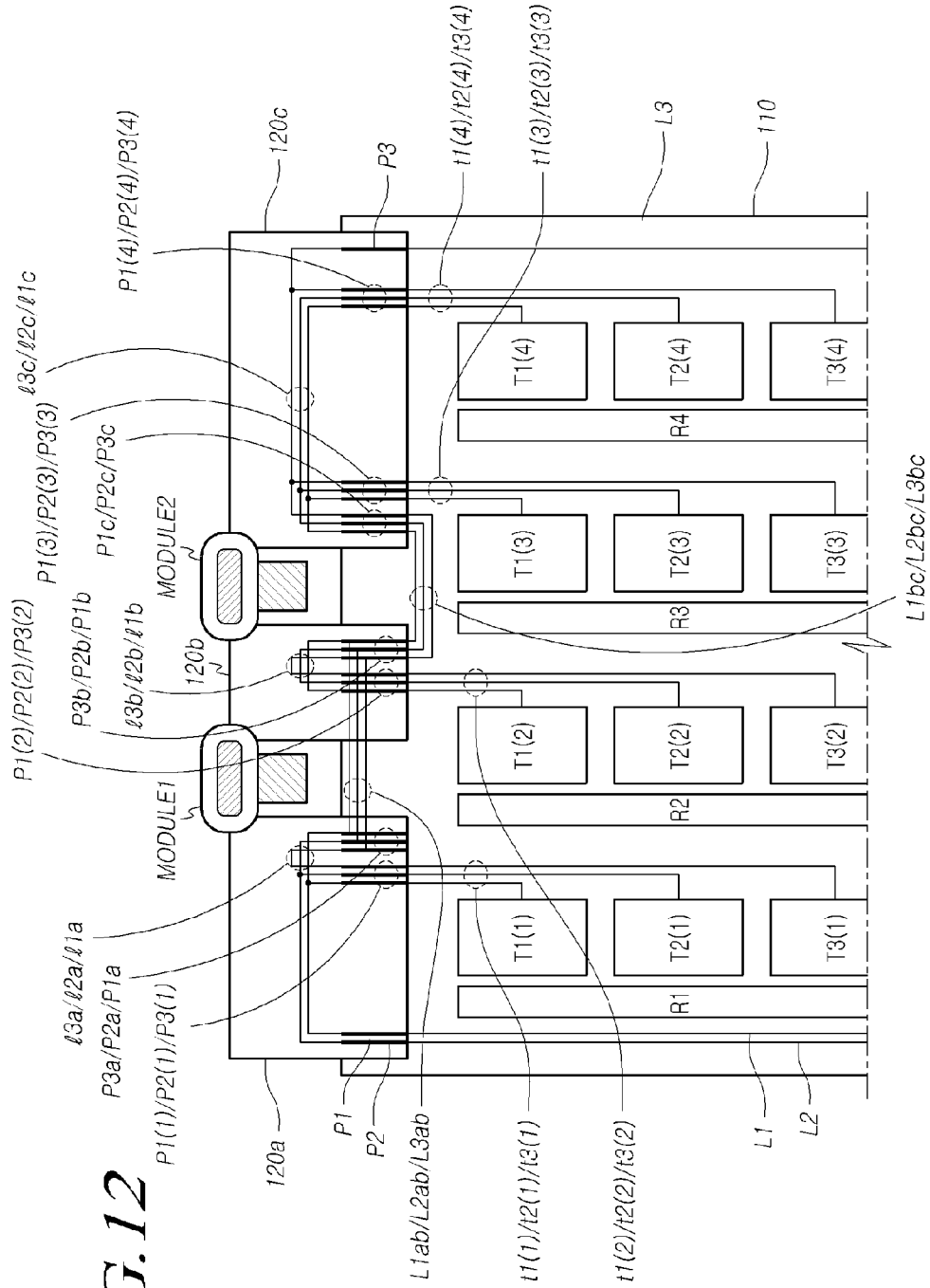
FIG. 12 illustrates a display device according to yet another embodiment of the present invention in detail.

FIG. 12 illustrates a display device according to yet another embodiment of the present invention in detail.

Referring to FIG. 12, in order to secure installation spaces of two application components MODULE 1 and MODULE 2 such as a camera module, a speaker module, a sensor module, and the like, the three FPCBs 120a, 120b, and 120c attached to the one side of the touch panel 110 are spaced apart from each other by predetermined distances.

As shown in FIG. 12, a connection structure for various signal transmission lines, including signal lines l1a/l2a/l3a, l1b/l2b/l3b, and l1c/l2c/l3c in the three FPCBs 120a, 120b, and 120c attached to the touch panel 110 such that they are spaced apart from each other, additional pads P1a/P2a/P3a, P1b/P2b/P3b, and P1c/P2c/P3c, and connection lines L1ab/L2ab/L3ab and L1bc/L2bc/L3bc for connecting the signal lines l1a/l2a/l3a, l1b/l2b/l3b, and l1c/l2c/l3c in the three FPCBs 120a, 120b, and 120c will be described below.

Referring to FIG. 12, among the first electrodes T1(1)~T1(4), T2(1)~T2(4), and T3(1)~T3(4) located at the first, second, and third rows, the first signal wires t1(1), t2(1), and t3(1) connected to the first electrodes T1(1), T2(1), and T3(1) located at the first column are correspondingly connected to signal lines l1a, l2a, and l3a formed on the first FPCB 120a through pads P1(1), P2(1), and P3(1) formed at the one side of the touch panel 110.

That is, the first signal wire t1(1) connected to the first electrode T1(1) is connected to the signal line l1a formed on the first FPCB 120a through the pad P1(1), the first signal wire t2(1) connected to the first electrode T2(1) is connected to the signal line l2a formed on the first FPCB 120a through the pad P2(1), and the first signal wire t3(1) connected to the first electrode T3(1) is connected to the signal line l3a formed on the first FPCB 120a through the pad P3(1).

Among the first electrodes T1(1)~T1(4), T2(1)~T2(4), and T3(1)~T3(4) located at the first, second, and third rows, the first signal wires t1(2), t2(2), and t3(2) connected to the first electrodes T1(2), T2(2), and T3(2) located at the second column are correspondingly connected to signal lines l1b, l2b, and l3b formed on the second FPCB 120b through pads P1(2), P2(2), and P3(2) formed at the one side of the touch panel 110.

That is, the first signal wire t1(2) connected to the first electrode T1(2) is connected to the signal line l1a formed on the first FPCB 120a through the pad P1(2), the first signal wire t2(2) connected to the first electrode T2(2) is connected to the signal line l2a formed on the first FPCB 120a through the pad P2(2), and the first signal wire t3(2) connected to the first electrode T3(2) is connected to the signal line l3a formed on the first FPCB 120a through the pad P3(2).

Among the first electrodes T1(1)~T1(4), T2(1)~T2(4), and T3(1)~T3(4) located at the first, second, and third rows, the first signal wires t1(3), t2(3), and t3(3) connected to the first electrodes T1(3), T2(3), and T3(3) located at the third column are correspondingly connected to signal lines l1c, l2c, and l3c formed on the third FPCB 120c through pads P1(3), P2(3), and P3(3) formed at the one side of the touch panel 110.

That is, the first signal wire t1(3) connected to the first electrode T1(3) is connected to the signal line l1c formed on the third FPCB 120c through the pad P1(3), the first signal wire t2(3) connected to the first electrode T2(3) is connected to the signal line l2c formed on the third FPCB 120c through the pad P2(3), and the first signal wire t3(3) connected to the first electrode T3(3) is connected to the signal line l3c formed on the third FPCB 120c through the pad P3(3).

Among the first electrodes T1(1)~T1(4), T2(1)~T2(4), and T3(1)~T3(4) located at the first, second, and third rows, the first signal wires t1(4), t2(4), and t3(4) connected to the first electrodes T1(4), T2(4), and T3(4) located at the fourth column are correspondingly connected to signal lines l1c, l2c, and l3c formed on the third FPCB 120c through pads P1(4), P2(4), and P3(4) formed at the one side of the touch panel 110.

That is, the first signal wire t1(4) connected to the first electrode T1(4) is connected to the signal line l1c formed on the third FPCB 120c through the pad P1(4), the first signal wire t2(4) connected to the first electrode T2(4) is connected to the signal line l2c formed on the third FPCB 120c through the pad P2(4), and the first signal wire t3(4) connected to the first electrode T3(4) is connected to the signal line l3c formed on the third FPCB 120c through the pad P3(4).

Such a signal transmission line connection structure for each column will be described again below, with reference to the connections for each row.

First, among the first electrodes T1(1), T1(2), T1(3), and T1(4) located at the first row, the first signal wire t1(1) connected to the first electrode T1(1) located at the first column is connected to the signal line l1a formed on the first FPCB 120a through the pad P1(1) formed at the one side of the touch panel 110, the first signal wire t1(2) connected to the first electrode T1(2) located at the second column is connected to the signal line l1b formed on the second FPCB 120b through the pad P1(2) formed at the one side of the touch panel 110, and the first signal wires t1(3) and t1(4) connected to the first electrodes T1(3) and T1(4) located at the third and fourth columns are connected to the signal line l1c formed on the third FPCB 120c through the pads P1(3) and P1(4) formed at the one side of the touch panel 110.

A connection structure of the signal lines l1a, l1b, and l1c formed on the first, second, and third FPCBs 120a, 120b, and 120c will be described below.

One end of the connection line L1ab for connecting signal lines l1a and l1b formed on the first and second FPCBs 120a and 120b is connected to the additional pad P1a connected to the signal line l1a formed on the first FPCB 120a, and the other end of the connection line L1*ab* is connected to the additional pad P1*b* connected to the signal line l1*b* formed on the second FPCB 120*b*.

One end of the connection line L1*bc* for connecting signal lines l1*b* and l1*c* formed on the second and third FPCBs 120*b* and 120*c* is connected to the additional pad P1*b* connected to the signal line l1*b* formed on the second FPCB 120*b*, and the other end of the connection line L1*bc* is connected to the additional pad P1*c* connected to the signal line l1*c* formed on the third FPCB 120*c*.

According to the signal transmission line connection structure, the signal line l1*a* formed on the first FPCB 120*a*, the signal line l1*b* formed on the second FPCB 120*b*, and the signal line l1*c* formed on the second FPCB 120*c* are connected to each other in series and are connected to the additional signal wire L1 formed at the outside of the touch panel 110 through the pad P1 formed at the one side of the touch panel 110.

Accordingly, the first electrodes T1(1), T1(2), T1(3), and T1(4) located at the first row can simultaneously receive a driving voltage supplied from the touch integrated circuit 500 through the additional signal wire L1.

Next, among the first electrodes T2(1), T2(2), T2(3), and T2(4) located at the second row, the first signal wire t2(1) connected to the first electrode T2(1) located at the first column is connected to the signal line l2*a* formed on the first FPCB 120*a* through the pad P2(1) formed at the one side of the touch panel 110, the first signal wire t2(2) connected to the first electrode T2(2) located at the second column is connected to the signal line l2*b* formed on the second FPCB 120*b* through the pad P2(2) formed at the one side of the touch panel 110, and the first signal wires t2(3) and t2(4) connected to the first electrodes T2(3) and T2(4) located at the third and fourth columns are connected to the signal line l2*c* formed on the third FPCB 120*c* through the pads P2(3) and P2(4) formed at the one side of the touch panel 110.

A connection structure of the signal lines l2*a*, l2*b*, and l2*c* formed on the first, second, and third FPCBs 120*a*, 120*b*, and 120*c* will be described below.

One end of the connection line L2*ab* for connecting signal lines l2*a* and l2*b* formed on the first and second FPCBs 120*a* and 120*b* is connected to the additional pad P2*a* connected to the signal line l2*a* formed on the first FPCB 120*a*, and the other end of the connection line L2*ab* is connected to the additional pad P2*b* connected to the signal line l2*b* formed on the second FPCB 120*b*.

One end of the connection line L2*bc* for connecting signal lines l2*b* and l2*c* formed on the second and third FPCBs 120*b* and 120*c* is connected to the additional pad P2*b* connected to the signal line l2*b* formed on the second FPCB 120*b*, and the other end of the connection line L2*bc* is connected to the additional pad P2*c* connected to the signal line l2*c* formed on the third FPCB 120*c*.

According to the signal transmission line connection structure, the signal line l2*a* formed on the first FPCB 120*a*, the signal line l2*b* formed on the second FPCB 120*b*, and the signal line l2*c* formed on the second FPCB 120*c* are connected to each other in series and are connected to the additional signal wire L2 formed at the outside of the touch panel 110 through the pad P2 formed at the one side of the touch panel 110.

Accordingly, the first electrodes T2(2), T2(2), T2(3), and T2(4) located at the second row can simultaneously receive a driving voltage supplied from the touch integrated circuit 500 through the additional signal wire L2.

Next, among the first electrodes T3(1), T3(2), T3(3), and T3(4) located at the third row, the first signal wire t3(1) connected to the first electrode T3(1) located at the first column is connected to the signal line l3*a* formed on the first FPCB 120*a* through the pad P3(1) formed at the one side of the touch panel 110, the first signal wire t3(2) connected to the first electrode T3(2) located at the second column is connected to the signal line l3*b* formed on the second FPCB 120*b* through the pad P3(2) formed at the one side of the touch panel 110, and the first signal wires t3(3) and t3(4) connected to the first electrodes T3(3) and T3(4) located at the third and fourth columns are connected to the signal line l3*c* formed on the third FPCB 120*c* through the pads P3(3) and P3(4) formed at the one side of the touch panel 110.

A connection structure of the signal lines l3*a*, l3*b*, and l3*c* formed on the first, second, and third FPCBs 120*a*, 120*b*, and 120*c* will be described below.

One end of the connection line L3*ab* for connecting signal lines l3*a* and l3*b* formed on the first and second FPCBs 120*a* and 120*b* is connected to the additional pad P3*a* connected to the signal line l3*a* formed on the first FPCB 120*a*, and the other end of the connection line L3*ab* is connected to the additional pad P3*b* connected to the signal line l3*b* formed on the second FPCB 120*b*.

One end of the connection line L3*bc* for connecting signal lines l3*b* and l3*c* formed on the second and third FPCBs 120*b* and 120*c* is connected to the additional pad P3*b* connected to the signal line l3*b* formed on the second FPCB 120*b*, and the other end of the connection line L3*bc* is connected to the additional pad P3*c* connected to the signal line l3*c* formed on the third FPCB 120*c*.

According to the signal transmission line connection structure, the signal line l3*a* formed on the first FPCB 120*a*, the signal line l3*b* formed on the second FPCB 120*b*, and the signal line l3*c* formed on the second FPCB 120*c* are connected to each other in series and are connected to the additional signal wire L3 formed at the outside of the touch panel 110 through the pad P3 formed at the one side of the touch panel 110.

Accordingly, the first electrodes T3(1), T3(2), T3(3), and T3(4) located at the third row can simultaneously receive a driving voltage supplied from the touch integrated circuit 500 through the additional signal wire L3.

Meanwhile, the numbers of the additional pads formed at the attachment areas of the three FPCBs 120*a*, 120*b*, and 120*c* attached to the one side of the touch panel 110 included in the display device shown in FIG. 9 according to another embodiment of the present invention are three, six, and three, respectively. However, it can be seen that the numbers of the additional pads formed at the attachment areas of the three FPCBs 120*a*, 120*b*, and 120*c* attached to the one side of the touch panel 110 included in the display device shown in FIG. 12 according to yet another embodiment of the present invention are three, three, and three, respectively.

That is, referring to FIG. 12, the additional pads formed at the attachment area of the first FPCB 120*a* correspond to P1*a*, P2*a*, and P3*a*, so the number of the additional pads is three. The additional pads formed at the attachment area of the second FPCB 120*b* correspond to P1*b*, P2*b*, and P3*b*, so the number of the additional pads is three. The additional pads formed at the attachment area of the third FPCB 120*c* correspond to P1*c*, P2*c*, and P3*c*, so the number of the additional pads is three.

Thus, the numbers of the additional pads formed at the respective attachment areas of the three FPCBs 120*a*, 120*b*, and 120*c* attached to the one side of the touch panel 110 are each three, so it can be seen that the respective numbers of the additional pads are equal to each other.

Further, it can be seen that the number of the additional pads does not increase by an amount corresponding to the additional pads formed in the touch panel 110 shown in FIG. 9 although the number of the FPCBs attached to the one side of the touch panel 110 shown in FIG. 12 is increased to three.

Thus, since the touch panel 110 and the display device 100 shown in FIGS. 11 and 12 according to yet another embodiment of the present invention have fewer additional pads than the touch panel 110 and the display device 100 shown in FIGS. 8 and 9 according to another embodiment of the present invention, the design and the manufacturing process of the display device 100 including the touch panel 110 and the like may become easier, and manufacturing costs thereof may be reduced.

A pattern for the connection lines L1ab/L2ab/L3ab and L1bc/L2bc/L3bc between the FPCBs 120a, 120b, and 120c in the display device 100 suitable for use with the embodiment described above with reference to FIGS. 11 and 12 will be described with reference to FIG. 13. However, a case where four FPCBs 120a, 120b, 120c, and 120d are attached to the one side of the touch panel 110 is illustrated in FIG. 13 in order to more clearly describe the pattern, and the connection line pattern will be described with reference to the illustrated case.

FIG. 13 illustrates a connection line pattern between FPCBs in a display device according to yet another embodiment of the present invention.

Referring to FIG. 13, when four FPCBs 120a, 120b, 120c, and 120d are attached to the one side of the touch panel 110 included in the display device 100 according to yet another embodiment of the present invention, all of connection lines L1ab/L2ab/L3ab formed between the first FPCB 120a and the second FPCB 120b in the touch panel 110, connection lines L1bc/L2bc/L3bc formed between the second FPCB 120b and the third FPCB 120c in the touch panel 110, and connection lines L1cd/L2cd/L3cd formed between the third FPCB 120c and the fourth FPCB 120d in the touch panel 110 are formed in different patterns.

This is different from the connection line patterns between FPCBs in the display device 100 shown in FIG. 10 according to another embodiment of the present invention, which are the same as each other.

The connection lines L1ab/L2ab/L3ab formed between the first FPCB 120a and the second FPCB 120b in the touch panel 110 and the connection lines L1cd/L2cd/L3cd formed between the third FPCB 120c and the fourth FPCB 120d in the touch panel 110 are formed in the same pattern.

However, the connection lines L1bc/L2bc/L3bc formed between the second FPCB 120b and the third FPCB 120c in the touch panel 110 are formed in a pattern different from the pattern of the connection lines L1ab/L2ab/L3ab and the connection lines L1cd/L2cd/L3cd.

Although it is not shown in FIG. 13, when a fifth FPCB 120e is further attached to the one side of the touch panel 110, the connection lines L1bc/L2bc/L3bc formed between the second FPCB 120b and the third FPCB 120c in the touch panel 110 and the connection lines L1de/L2de/L3de formed between the fourth FPCB 120d and the fifth FPCB 120e in the touch panel 110 may have the same pattern.

That is, the connection pattern between the FPCBs in the display device 100 according to yet another embodiment of the present invention may be a zigzag pattern in which a down-up-down-up pattern is repeatedly formed.

According to the connection line pattern, the number of additional pads (six pads) formed at an attachment area of each of the second FPCB 120b and the third FPCB 120c in the touch panel 110 is larger than the number of additional pads (three pads) formed at an attachment area of each of the first FPCB 120a and the fourth FPCB 120d in the touch panel 110.

Meanwhile, referring to FIGS. 12 and 13, as the number of FPCBs attached to the one side of the touch panel 110 increases, the number of additional pads does not increase in proportion to the increased number of FPCBs. This increases the ease in the design and the manufacturing process of the display device 100 including the touch panel 110 and the like, and reduces manufacturing costs thereof.

The above-described display device 100 according to the embodiments of the present invention may further include a display panel (not shown) such as a Liquid Crystal Display (LCD), an Organic Light Emitting Diode (OLED), and the like, and the touch panel 110 may be attached on the display panel in an add-on type or may be embedded in the display panel in an on-cell type. This is described in more detail with reference to FIGS. 14 and 15 which are two sectional views taken along line A-A' of FIG. 4.

FIG. 14 is a sectional view showing a display device according to embodiments of the present invention.

FIG. 14 is a view illustrating the touch panel 110, in which the first electrodes and the second electrodes are formed, being attached on a display panel 1400 in an add-on type.

Referring to FIG. 14, the display panel 1400 has a cell 1420 between a lower glass 1410 and an upper glass 1430. An upper polarizer (not shown) is further formed above the upper glass 1430, and a lower polarizer (not shown) is further formed below the lower glass 1410.

Here, the cell 1420 may be, for example, a liquid crystal layer of the LCD or an organic layer of the OLED.

The display panel 1400 is attached to the touch panel 110 through a layer 1440 above the display panel 1400, formed of air or a bonding agent. Here, for example, an Optical Clear Resin (OCR) or an Optically Clear Adhesive (OCA) may be employed as the bonding agent.

Referring to FIG. 14, a cover lens is located above the touch panel 110.

FIG. 15 is another sectional view showing a display device according to embodiments of the present invention.

FIG. 15 is a view illustrating the touch panel 110, in which the first electrodes and the second electrodes are formed, being embedded in a display panel 1500 in an on-cell type.

Referring to FIG. 15, the display panel 1500 has a cell 1520 between a lower glass 1510 and an upper glass 1530. Here, the cell 1520 may be, for example, a liquid crystal layer of the LCD or an organic layer of the OLED.

Referring to FIG. 15, the touch panel 110 is formed above the upper glass 1530.

An upper polarizer (not shown) is further formed above the touch panel 110, and a lower polarizer (not shown) is further formed below the lower glass 1510.

As shown in FIG. 15, a cover lens is attached to the display panel 1500 in which the touch panel 110 is embedded in an on-cell type, through a layer 1440 formed by air or a bonding agent. Here, for example, an Optical Clear Resin (OCR) or an Optically Clear Adhesive (OCA) may be employed as the bonding agent.

In accordance with an aspect of the present invention, there is provided a touch panel and a display device having a structure in which application components are easily installed.

In accordance with another aspect of the present invention, there is provided a touch panel and a display device having a signal transmission line connection structure for effectively detecting a touch.

In accordance with another aspect of the present invention, there is provided a touch panel and a display device in which a material of a signal transmission line additionally formed on the touch panel to transfer a signal between a plurality of FPCBs attached to the touch panel is the same as that of an electrode, thereby easily performing the manufacturing process.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by these embodiments. The scope of the present invention shall be construed on the basis of the accompanying claims in such a manner that all of the technical ideas included within the scope equivalent to the claims belong to the present invention.

The invention claimed is:

1. A display device comprising:
    a touch panel comprising first electrodes, second electrodes, first signal wires connected to the first electrodes, and second signal wires connected to the second electrodes, wherein some of the first signal wires connected to the first electrodes are formed toward one side of the touch panel and other of the first signal wires are formed toward another side of the touch panel, or all of the first signal wires connected to the first electrodes are formed toward the one side of the touch panel, and the second signal wires connected to the second electrodes are formed toward the another side of the touch panel;
    two or more flexible printed circuit boards (FPCBs) attached to the one side of the touch panel and spaced apart from each other by a distance which allows installation of an application component, wherein each of the two or more FPCBs attached to the one side of the touch panel comprises first signal lines connected to all or some of the first signal wires through pads formed on the touch panel;
    one or more FPCBs attached to the another side of the touch panel, wherein the one or more FPCBs attached to the another side of the touch panel comprises second signal lines connected to the second signal wires through pads formed on the touch panel;
    additional pads for connecting the first signal lines formed on the two or more FPCBs attached to the one side of the touch panel; and
    connection lines connected between the additional pads,
    wherein when three or more FPCBs are attached to the one side of the touch panel, and numbers of the additional pads formed on each of the three or more FPCBs attached to the one side of the touch panel, respectively, are different from each other, the connection lines connected between the additional pads formed on the three or more FPCBs attached to the one side of the touch panel are formed in a same pattern.

2. The display device as claimed in claim 1, wherein the touch panel has a single layer electrode structure in which the first electrodes and the second electrodes are formed in one layer.

3. The display device as claimed in claim 1, wherein the one or more FPCBs attached to the another side of the touch panel further comprises third signal lines connected to some of the first signal wires through the pads formed on the touch panel.

4. The display device as claimed in claim 1, wherein the connection lines are formed of a same material as that of the first and second electrodes.

5. The display device as claimed in claim 1, wherein a touch integrated circuit is located at one of the two or more FPCBs attached to the one side of the touch panel and the one or more FPCBs attached to the another side of the touch panel.

6. The display device as claimed in claim 5, wherein additional signal wires for connecting signal lines formed on each of the FPCBs where the touch integrated circuit is not located among the two or more FPCBs attached to the one side of the touch panel and the one or more FPCBs attached to the another side of the touch panel, to the touch integrated circuit, are formed at an outside of the touch panel.

7. The display device as claimed in claim 6, wherein the additional signal wires are formed of a same material as that of the first and second electrodes.

8. A touch panel comprising:
    first electrodes and second electrodes formed as a touch sensor;
    first signal wires connected to the first electrodes and second signal wires connected to the second electrodes, wherein some of the first signal wires connected to the first electrodes are formed toward one side of the touch panel and other of the first signal wires are formed toward another side of the touch panel, or all of the first signal wires connected to the first electrodes are formed toward the one side of the touch panel, and the second signal wires connected to the second electrodes are formed toward the another side of the touch panel;
    attachment portions on the one side of the touch panel to which two or more FPCBs are attached to be spaced apart from each other so as to enable installation of an application component of the display device comprising the touch panel, wherein each of the two or more FPCBs comprises first signal lines connected to all or some of the first signal wires through pads formed on the touch panel;
    one or more attachment portions on the another side of the touch panel to which one or more FPCBs are attached, wherein the one or more FPCBs attached to the another side of the touch panel comprises second signal lines connected to the second signal wires through pads formed on the touch panel;
    additional pads for connecting the first signal lines formed on the two or more FPCBs attached to the one side of the touch panel;
    and connection lines connected between the additional pads,
    wherein when three or more FPCBs are attached to the one side of the touch panel, and numbers of the additional pads formed on each of the three or more FPCBs attached to the one side of the touch panel, respectively, are different from each other, the connection lines connected between the additional pads formed on the three or more FPCBs attached to the one side of the touch panel are formed in a same pattern.

9. The touch panel of claim 8, wherein the touch panel has a single layer electrode structure in which the first electrodes and the second electrodes are formed in one layer.

10. The touch panel of claim 8, wherein the one or more FPCBs attached to the another side of the touch panel further comprises third signal lines connected to some of the first signal wires through the pads formed on the touch panel.

11. The touch panel of claim 8, wherein the connection lines are formed of a same material as that of the first and second electrodes.

12. The touch panel of claim 8, wherein a touch integrated circuit is located at one of the two or more FPCBs attached to the one side of the touch panel and the one or more FPCBs attached to the another side of the touch panel.

13. The touch panel of claim 12, wherein additional signal wires for connecting signal lines formed on each of the FPCBs where the touch integrated circuit is not located among the two or more FPCBs attached to the one side of the touch panel and the one or more FPCBs attached to the another side of the touch panel, to the touch integrated circuit, are formed at an outside of the touch panel.

14. The touch panel of claim 13, wherein the additional signal wires are formed of a same material as that of the first and second electrodes.

\* \* \* \* \*